(12) United States Patent
Summers et al.

(10) Patent No.: US 7,587,736 B2
(45) Date of Patent: Sep. 8, 2009

(54) WIDEBAND DIRECT-TO-HOME BROADCASTING SATELLITE COMMUNICATIONS SYSTEM AND METHOD

(75) Inventors: Macy W. Summers, Bryn Mawr, PA (US); Marshall W. Pagon, Haverford, PA (US); Francisco Gonzales, Maple Glen, PA (US); John K. Hane, Bethesda, MD (US); Jeffrey B. Freedman, Laurel, MD (US)

(73) Assignee: Xanadoo Company, Bala Cynwyd, PA (US)

( * ) Notice: Subject to any disclaimer, the term of this patent is extended or adjusted under 35 U.S.C. 154(b) by 1493 days.

(21) Appl. No.: 10/330,133

(22) Filed: Dec. 30, 2002

(65) Prior Publication Data

US 2003/0217362 A1 Nov. 20, 2003

Related U.S. Application Data

(60) Provisional application No. 60/342,769, filed on Dec. 28, 2001.

(51) Int. Cl.
*H04N 7/173* (2006.01)
*H04J 3/00* (2006.01)
*H04N 7/20* (2006.01)
*H04J 1/00* (2006.01)

(52) U.S. Cl. .................. 725/95; 725/94; 709/234; 709/235

(58) Field of Classification Search ............. 725/63–70, 725/94–95; 709/234–235
See application file for complete search history.

(56) References Cited

U.S. PATENT DOCUMENTS

| | | | |
|---|---|---|---|
| 5,559,549 A | 9/1996 | Hendricks et al. | |
| 5,905,940 A | 5/1999 | Arvisais | |
| 5,930,680 A | 7/1999 | Lusignan | |
| 5,940,148 A | 8/1999 | Joseph et al. | |
| 5,978,652 A | 11/1999 | Burr et al. | |
| 5,995,495 A | 11/1999 | Sampson | |
| 6,192,083 B1 * | 2/2001 | Linzer et al. | 375/240.29 |
| 6,199,205 B1 | 3/2001 | Chopping | |
| 6,574,794 B1 * | 6/2003 | Sarraf | 725/63 |
| 6,674,796 B1 * | 1/2004 | Haskell et al. | 375/240.01 |
| 6,813,277 B2 * | 11/2004 | Edmon et al. | 370/442 |
| 7,096,487 B1 * | 8/2006 | Gordon et al. | 725/91 |

(Continued)

OTHER PUBLICATIONS

PCT/US02/41731 International Search Report, Pegasus Development Corp.

*Primary Examiner*—Christopher Kelley
*Assistant Examiner*—Reuben M Brown
(74) *Attorney, Agent, or Firm*—Pillsbury Winthrop Shaw Pittman LLP

(57) ABSTRACT

The present invention relates to one- or two-way Direct-To-Home (DTH) satellite communications systems which broadcast high bit rate wideband television and multimedia content to user terminals located within a desired coverage area and, more specifically, a single or multi-transponder Direct-To-Home satellite communications system in which a high bit rate wideband data stream is comprised of real-time, statistically multiplexed information and non-real-time information that is transmitted to a subscriber media gateway device for storage and later-use. The user terminal contains a specially designed receiving system and may contain a transmitter for transmission of a return data channel to the Broadcast Center.

4 Claims, 20 Drawing Sheets

U.S. PATENT DOCUMENTS

| | | | |
|---|---|---|---|
| 7,174,177 B1* | 2/2007 | Chander et al. | 455/466 |
| 7,240,358 B2* | 7/2007 | Horn et al. | 725/87 |
| 2002/0066102 A1* | 5/2002 | Chapman et al. | 725/49 |
| 2002/0108116 A1* | 8/2002 | Dillon | 725/63 |
| 2002/0167918 A1* | 11/2002 | Brewer | 370/324 |
| 2004/0030797 A1* | 2/2004 | Akinlar et al. | 709/232 |
| 2004/0060065 A1* | 3/2004 | James et al. | 725/71 |
| 2004/0133907 A1* | 7/2004 | Rodriguez et al. | 725/14 |

* cited by examiner

KNOWN ART

FIG. 4    KNOWN ART

KNOWN ART

KNOWN ART

WIDEBAND DIRECT-TO-HOME BROADCASTING SATELLITE COMMUNICATIONS SYSTEM AND METHOD

This application claims priority of Provisional Application Ser. No. 60/342,769, filed Dec. 28, 2001, the entire disclosure of which is hereby incorporated by reference.

BACKGROUND OF THE INVENTION

1. Field of the Invention

This invention relates to communications systems and methods for broadcasting television and multimedia content to user terminals located within desired coverage areas, and also relates to user terminals and receiving devices for receiving content transmitted via satellite communications networks.

2. Background Information

A satellite is a sophisticated electronic communications relay station orbiting the Earth. Earth stations (which are also known as parabolic dishes) transmit signals to a satellite in orbit, which is called "uplinking." Satellites receive this signal, amplify it, shift it to a different (usually lower) frequency and then feed the outgoing signal into an on-board satellite antenna, where the signal is focused into a beam and sent back to Earth. The act of sending the signal back to earth is known as "downlinking." The spacecraft electronic hardware that receives the uplinked signal, amplifies it and sends it back to Earth is called a "transponder."

Satellites are used around the world in a variety of entertainment and telecommunications applications. Most commercial satellite communications take place in L, C, and Ku band microwave frequencies. Satellites have distinct advantages over terrestrial networks for wide area broadcasting, multi-point-to-point communications and for broadcasting in rural or geographically disadvantaged areas. As an example, satellite data terminals, known as VSATs (Very Small Aperture Terminals), provide credit and debit card transaction network communications from retail stores, gas stations, and banks at hundreds of thousands of locations around the globe. New locations can be provisioned and decommissioned quickly and at a low cost, compared to the time and cost of connecting locations by other methods. As another example, mobile voice networking via satellites enables individuals (such as reporters or natural resource engineers) to utilize portable computers or handheld satellite phones to report from third-world countries or low-density population rural areas.

Perhaps the most commonly associated application of satellite communications is for point-to-multipoint television distribution. Across the world, it is likely that satellites are used for at least one segment of television distribution, wherever it is watched. Broadcast networks supply content to local affiliates and cable television stations provide content to local cable providers (headend systems) via satellite. As the programming content (or, perhaps, syndication programming and advertising) is received over satellite, it is then broadcast to consumers by transmission from the local affiliate or the local cable company. For example, television programming from a single network hub can be delivered to numerous ground-based broadcasters or cable operators by a geosynchronous satellite. Such broadcast applications take full advantage of the wide area coverage provided by geosynchronous satellites.

As shown in FIG. 1, the information that is to be broadcast to a number of receivers within the field of view of the satellite is delivered to a hub earth station 1, which then uplinks the information to the satellite 2. The satellite then relays the information to user terminals 3 located within a broad coverage footprint 4 on the earth. For example, television programming from a single uplink earth station can be delivered to a national network of terrestrial TV broadcast affiliates by a geosynchronous satellite. In excess of 10,000 US cable television headends also receive the majority of their programming via satellite. Such broadcast applications take full advantage of the wide area coverage provided by geosynchronous satellites. Every television station in the United States owns and operates at least one television receive-only (TVRO) satellite terminal, and many stations own uplink terminals to deliver news feeds via satellite. Television programming is most commonly distributed using the C band (6/4 GHz) of frequencies.

The cable/satellite connection described above was the first widespread use of satellite technology and one that greatly influenced the ultimate direction of satellite technology. A typical cable system head-end in the United States will continuously receive up to 70 satellite-delivered video channels from a handful of Fixed Satellite Services (FSS) satellites in the Western North American geostationary arc known as the "cable neighborhood." Much of today's cable subscriber programming is transmitted in an analog format, using the satellite equivalent of a conventional 6 MHz TV channel. FSS satellites generally comprise of 24 channels, each 36 MHz wide (generally equivalent in capacity to a 6 MHz terrestrial television signal). Individual cable head-ends point a TVRO earth station at each satellite in the cable neighborhood to receive the analog and digital feeds from the content providers. Integrated Receiver Decoders (IRDs) are used to receive, demodulate, decrypt, and decode the individual programs. The demodulated (baseband) signals are then remodulated according to 6 MHz NTSC standards onto a cable TV frequency plan and combined with local off-air signals and cable modem data to form the broadband service that is amplified and relayed along a coaxial cable plant to the home subscriber.

The later decades of the twentieth century ushered in the advent of the latest innovation in satellite television distribution: digital multi-channel television via Direct Broadcast Satellite (DBS). This has garnered over 30 million household subscribers worldwide, thanks to free-flowing content, protected spectrum allocation, powerful satellite designs, low cost set top box technology, and a global regulatory environment that favors facilities-based multi-channel video competition. Examples of direct-to-home video distribution systems include the General Motors/Hughes Electronics DIRECTV system and the EchoStar DISH system. In such systems, the video signals are digitally encoded/formatted at the uplink or at a local off-air collection point using a compression/transport standard developed by the Motion Picture Experts Group (MPEG-2, ISO/IEC 13818-1). The signals are then encrypted and modulated to satellite transport specifications, usually those given in Digital Video Broadcasting (DVB-S) standards. The MPEG-2 signals are combined with an integrated Electronic Program Guide (EPG) at a single headend (the DTH broadcast center) that serves the entire United States. Instead of adding local signals at each headend, as in cable TV distribution, satellite DTH service providers collect the off-air signals at a local point-of presence (PoP) and backhaul them to the national broadcast center for transmission to the subscriber.

Most DTH service providers utilize high-power Ku band (12/17 GHz) satellites using the International Telecommunications Union Broadcasting Satellite Services (BSS) channel plan. Under the BSS plan, each orbital position is assigned 16 frequencies on two polarizations, thereby providing 32 channels. The 32 channels of approximately 27 MHz each can deliver between 200 and 300 digital video channels to the Continental United States (CONUS) and, with spot beam technology (described below in further detail), hundreds of local television channels into the smaller areas served by the spot beams.

Various schemes for direct-to-home broadcasting real-time and non-real-time television and multimedia content are known. One such technique, described by DVB-S (EN 300 421—Framing structure, channel coding and modulation for 11/12 GHz satellite services) is used throughout the world to broadcast in Ku-band BSS and FSS frequencies. Another method is a proprietary (but similar) technique used at DIRECTV. Both of these methods send real-time television and multimedia content using a traditional 32 or 24 frequency transponder plan. Although high-speed, full transponder data transmission is stipulated in both formats, the broadcaster operator does not transmit television programming in faster than real-time. These systems suffer from bandwidth limitations and the need for more efficient coding.

The fundamental unit of a satellite is a "transponder," which refers to the Radio Frequency (RF) repeater described above within a satellite communications payload. A transponder translates the frequency of the uplink signal to a specified downlink frequency. The traditional transponder bandwidth of 36 MHz was chosen in 1965 for the first commercial satellite, "Early Bird," to accommodate FM modulation of the 6 MHz television signal waveform. Each transponder was capable of receiving and retransmitting a single analog television signal. This became the fundamental building block of commercial satellite architecture.

The development of more powerful rockets in the 1960's enabled larger satellites to be built and launched to geosynchronous orbit. As rockets and satellites grew more incrementally more powerful, the gains were allocated to incrementally larger numbers of transponders. In some cases, higher power was used to reduce the transponder bandwidth to 27 MHz, which is sufficient for transmission of a single television signal fed with more power.

The 36/27 MHz transponder thus became not only a basic building block of satellites, but also the basic unit of satellite commerce. Most commercial satellites were, and still are, designed, built and launched by enterprises that offer short and long term transponder leases to other enterprises, such as television stations and networks. A company wishing to broadcast a single analog television channel leases a single transponder that covers an area into which the company wishes to transmit its programming. If the company is a cable television network, it will usually prefer a satellite that carries many other cable television networks, since the signal can be more easily received by cable headends that already receive other services from that satellite. Instead of building a new receiving dish, the cable headend will simply have to add a new tuner to receive the additional transponder frequency. Although a single satellite receiving dish can collect all signals transmitted by a single satellite, a separate tuner is needed for each transponder. Twenty four tuners, but only one dish, is needed to receive simultaneously all of the signals from a 24 transponder satellite. A single tuner can be adapted to be capable of tuning among all 24 transponders, but can only receive one transponder at a time.

The need for multiple tuners is a consequence of the division of satellite capacity into multiple transponders. The burden of this constraint was relatively minor when most transmissions were analog and most satellite television transmissions were directed to commercial cable headends or broadcast stations with sophisticated plants and full time engineering staffs. The cost of adding a tuner to a cable headend serving hundreds or thousands of homes was nominal.

However, more and more satellite television transmissions—including those of DBS providers—are intended for receipt by consumers directly. The need for a separate tuner for each transponder received simultaneously has been a disadvantage for DBS providers, as it has driven up the cost of provisioning their customers to view different channels, at the same time, on different television sets, or to watch one channel while recording another.

Even with four or more tuners, DBS customers can simultaneously access only a small fraction of the total programming offered by a DBS provider, which may be using 40 or more transponders. This limitation is not fully appreciated today, since the overwhelming majority of television viewing is ephemeral or "real-time"—that is, the programming is viewed simultaneously with its transmission. Since there is a practical limit to the number of television channels a typical household can use at any one time, two, four, or six tuners will accommodate the requirements of most subscribers.

Cable television systems also have grown in an incremental way, with the basic unit still based on a single analog television channel.

In a world limited to "real-time" television usage, the incremental growth of both transmission and reception capacity through the addition of analog-channel equivalents on the transmission end, and additional tuners on the reception end, masks the inherent limitations of the current state of the art. The availability of personal video recorders ("PVRs") will change the way in which people use television and will expose the underlying weakness of the incremental approach used by all current generation television delivery systems. PVRs continuously filter all available programming and then select and record programming on digital storage media for later use. The programming is selected based on user-defined profiles and preferences, wholly without regard to the source of the programming or the time of the broadcast. Because the programming may be watched at the leisure of the viewer, rather than at the time broadcast, the practical limit on the number of channels a consumer may wish to access (for recording or viewing) simultaneously is much higher than it is in a household that relies primarily on synchronous viewing, with occasional recording to videotape or use of picture-in-picture. It is not only conceivable, but likely, that a household 5 years hence may wish to access a dozen or more programs simultaneously. One television may be tuned to two sports broadcasts (one with picture in picture) while a third game is being recorded. Another television may be tuned to a high definition movie, while a third is employed for high-bandwidth full motion video gaming. At the same time, one or more PVRs may be recording six or more programs being broadcast simultaneously that happen to meet the profiles set by four or more people in the household. A time overlap of even one minute between two programs could preclude the recording of both, if the system limits the number of programs that can be simultaneously accessed.

The limits of current systems are clear. Unless a DBS receiving user terminal is equipped with 32 tuners, the user is limited to receiving only a small fraction of the content that is being transmitted at any one time. As noted, most satellite and digital cable set-top boxes can tune only to one or two "channels" simultaneously. The single or dual tuner design is a workable limitation if each television set has its own dedicated set-top box (STB). However, for a feature such as "picture-in-picture," a second tuner is necessary. If a user wishes to view a "picture-in-picture" TV on a first transponder and a standard-sized TV channel from a second transponder and simultaneously record another channel, a third tuner is required. Eventually, the economic model for transponders (and the 6 MHz "channels" architecture associated with cable) becomes overburdened by the need for expensive multi-tuner set-top technologies on every TV set.

The technical platforms of the existing high power DBS services in the United States were designed nearly 10 years ago. DirecTV-1, a Boeing 601 class satellite, was launched in December 1993 and DirecTV service began in June 1994. Technologies such as hard drive-based PVRs, advanced video on demand (VoD), and wireless home networking were not contemplated in the early DBS thinking. Software-based video decoding and other "future proofing" design elements also were not feasible in 1994 due to poor microprocessor power and expensive Random Access Memory (RAM). Although some of these state-of-the-art features have been layered on top of legacy DTH systems, the need for backward compatibility has limited the ultimate potential for such powerful technologies. The full benefits of a decade of hyper-growth of digital media technology can be realized only in a system that is designed from the start with those benefits in mind.

In summary, the use of transponders, which were designed around television's 6 MHz channels, have resulted in the development of a "transponder approach," in which the available RF spectrum is divided into manageable channels, or transponders. Known satellite communications systems operating in a broadcast mode therefore suffer from limitations on the data rate format and methods at which information may be delivered to user terminals.

Known systems for delivering large bandwidth multimedia content to users at high data rates suffer from a number of other limitations as well. As an example, the Geocast system, developed by Geocast Network Systems, Inc., promised to deliver high quality real-time or non-real-time multimedia content to personal computer desktops or set-top boxes by using new digital television broadcast or satellite spectrum. In the satellite-based Geocast model, multimedia content was uplinked to a DBS or FSS satellite that in turn broadcast the content for receipt by users with specially designed receivers. The digital TV broadcast spectrum manifestation of the Geocast system used 12 megabits per second to a "GeoBox" personal server which was equipped with a 40 GB hard drive and used a return path provided via the subscriber's dial-up or broadband ISP. The special receivers accepted live data feeds or could store content for later retrieval. The Geocast system therefore in principle allowed users to overcome the bandwidth limitations of conventional and last-mile Internet connections, for example. After users customized their receivers to their own interests, preferences, and demographics, the Geocast system matched content to individual receivers and delivered matched content to the receivers for real-time or later viewing.

While in principle the Geocast system combined the bandwidth and immediacy of broadcast television with the customization and control enabled by web browsing, the product suffered from several limitations. The bandwidth of the Geocast delivery service was limited by the bandwidth of the digital television frequency or the single satellite transponder bandwidth. Moreover, the Geocast system was focused on providing a variety of multimedia content, including audio, text, low-resolution video, and web pages. It is possible to provide a wide variety of such low-bandwidth media in a traditional television distribution channel, and this was the Geocast approach. Geocast did not disclose a method to make a large number of high bandwidth digital content accessible simultaneously, as it is being transmitted, by low cost consumer receiving equipment.

In summary, there is no satisfactory existing solution to the problem of delivering multimedia content in a broadcast mode to users at very high data rates. Accordingly, there is a need for an improved system and method for transmitting and receiving multimedia content.

SUMMARY OF THE INVENTION

The present invention relates to one- or two-way Direct-To-Home (DTH) satellite communications systems which broadcast high bit rate wideband television and multimedia content to user terminals located within a desired coverage area and, more specifically, a single or multi-transponder Direct-To-Home satellite communications system in which a high bit rate wideband data stream is comprised of real-time, statistically multiplexed information and non-real-time information that is transmitted to a subscriber media gateway device for immediate, or synchronous use, or storage and later, or asynchronous use. The user terminal contains a specially designed receiving system and may contain a transmitter for transmission of a return data channel to the Broadcast Center.

The DTH communications system is a hybrid satellite broadcasting method with which a subscriber receives traditional real-time DBS/Cable "channels" carried over a first wideband, wide area transponder along with asynchronous, non-real time high-speed movie downloads and multimedia files for delivery to PVRs or other mass storage devices (herein referred to as "PVRs") carried in the same transponder. The system also carries additional real-time channels or programming, which, in a preferred embodiment is comprised of local broadcast "network" television channels, along with additional asynchronous content of local or regional interest, in regional, wideband, spot beam transponders. The subscriber receives the signals with a single or plurality of wideband tuner(s) and demodulator(s) located in a home media gateway (HMG) device.

A broadcasting system according to the invention enables new consumer DTH applications. For example, an entire month's worth of pre-recorded video programming in a Subscription Video on Demand (SVoD) business model can be "pushed" to PVRs in a matter of hours, making it possible for subscribers to consume that media at their leisure. "Pull" VoD is enabled through the regional spot beam transponders. Software updates and video games can also be delivered quickly to a nationwide subscriber base at very low cost. All of this can be accomplished without limiting the ability of the consumer to access simultaneously as many real-time programs as he or she desires.

A direct-to-home satellite communications system according to the present invention is described. The system includes a plurality of encoders for encoding a plurality of programming content into digital signals of at least one digital format. A wideband multiplexer multiplexes the encoded signals for satellite communications in a wideband format. A space segment transmits the multiplexed signals in a wideband format, and a plurality of receiving systems receive the multiplexed signals. The receiving systems include a wideband demultiplexer for demultiplexing the multiplexed signals and a decoder for decoding the demultiplexed digital signals.

A method according to the present invention is described for transmitting programming content in a direct-to-home satellite communications system. A plurality of signals of programming content are received and encoded. A plurality of the encoded signals are multiplexed in a wideband format. The multiplexed encoded signals are uplinked and transmitted in a single wideband transponder.

A method according to the present invention is also described in which pre-scheduled real-time content is fed into a wideband multiplexer (wherein the real-time content requires a portion of total bandwidth that is available for satellite communications), the amount of bandwidth remaining for satellite communications for concurrent transmission with real-time content is determined, and non-real-time content is fed into the wideband multiplexer, wherein the amount of non-real-time content is selected to minimize the available bandwidth.

A direct-to-home satellite broadcasting system according to the present invention is described, comprising a contribution network, a broadcast center, an uplink facility, a space segment, and consumer equipment for receiving satellite broadcast signals.

An uplink system for transmitting television programming or other multimedia content over a direct-to-home satellite communications system according to the present invention is disclosed. The system comprises first and second uplink facilities for uplinking encoded signals to a space segment, wherein the facilities are at different geographical locations. A switch directs encoded signals to the first or second uplink facility depending upon weather conditions at the uplink facilities.

Consumer equipment for a direct-to-home satellite communications system according to the present invention is also disclosed. The equipment includes a tuner/demodulator, and a wideband demultiplexer receiving signals from the tuner/demodulator, wherein different demultiplexed signals can be fed simultaneously into different playback or storage devices from the wideband demultiplexer.

A direct-to-home satellite broadcasting system according to the present invention is disclosed, comprising a national broadcast center for transmitting content intended for distribution to a national audience in a single national beam, and a plurality of regional broadcast centers for transmitting regional content intended for distribution to a respective regional audience in spot beams incident to the respective regional areas.

A satellite broadcasting system is also disclosed in which the broadcast center includes software-based encoders that enable generation of signals with different encoding standards within the transport stream. A receiver is disclosed that includes at least one software-based decoder for receiving transmitted program content for playback, wherein the decoder enables reception of signals with different encoding standards within a transport stream on a per program basis.

A method is also disclosed for scheduling transmission of content in a broadcasting system. A schedule of content to be transmitted is read, wherein each item of content is grouped into a plurality of segments, and for each segment of each item of content, (i) if the item of content to be transmitted is real-time content, the real-time content is sent to the playout buffer during the period of time scheduled for playback, and the remaining bandwidth available after transmission of the real time content is calculated; and (ii) if the item of content to be transmitted is a carousel, the block size, number of blocks and repetition rate are calculated to fit within the available bandwidth based upon the file size and bandwidth allocation, blocks of the non-linear carousel are sent to the playout buffer, and the remaining bandwidth available after transmission of the carousel content is calculated; and (iii) if the item of content is a file, a percentage of the file is transmitted according to the available bandwidth and priority associated with transmission of the file, wherein the schedule is re-read after each calculation of the remaining bandwidth available.

DETAILED DESCRIPTION OF THE EXEMPLARY EMBODIMENTS

The Ka Band Spectrum

Figure 1:
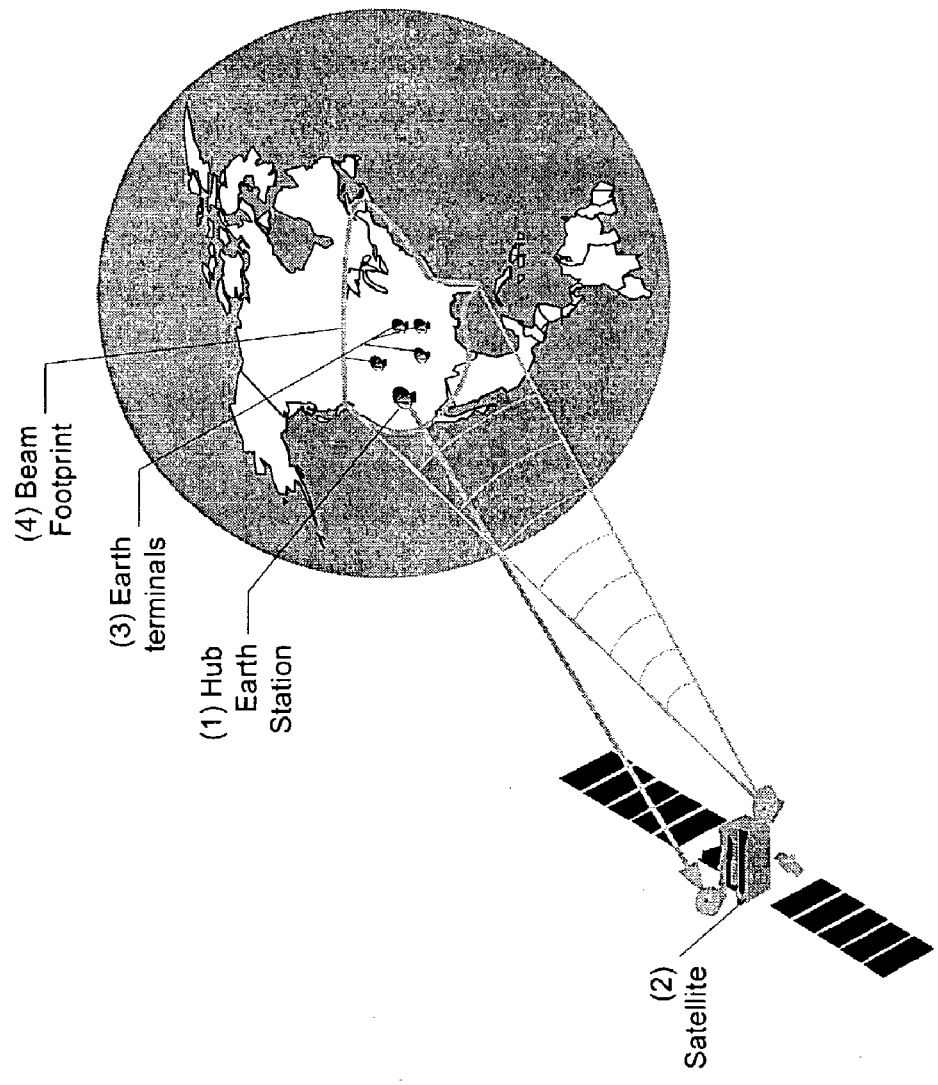
FIG. 1 is a pictorial representation of a conventional satellite communications system.

The past decade has seen regulatory developments authorizing commercial use of two GHz of satellite spectrum at 20/30 GHz (Ka band), and many operators have proposed to provide communications services in this new band. The bandwidth can be made available to users located in the field of view of the satellite and can be multiplied through a variety of frequency reuse (spot beam) techniques.

Ka band satellite communications frequencies can be used to provide direct-to-home broadcasting services with Direct Broadcast Satellite (DBS) sized antennas and low cost user terminal hardware. Occupying a slightly higher frequency range than Ku band satellites, Ka band systems can offer high capacity, open platforms, and high levels of flexibility. These higher operating frequencies confer several advantages. First, comparably smaller antennas (satellite dishes) may be utilized on the ground for initiating communications on a satellite return channel via a small satellite dish (as will be explained in further detail below with reference to FIG. 14).

A second advantage of utilizing the 2 GHz of Ka band spectrum is that a much more efficient use can be made of the available spectrum because of the number of times that frequencies can be reused. Spot beams are used to deliver different content to different regional areas. However, all of the tiled spot beams (as will be described in further detail below with reference to FIG. 15) do not have to operate at unique frequencies. By using the physical separation between the regional areas, the same frequency can be used in non-adjacent beams. This, coupled with the frequency rejection provided by polarization, enables a large area to be covered using only a few frequency and polarization combinations. The spot beam can be narrow and focused, to enable a four times frequency reuse spot beam pattern to be overlaid onto the CONUS signal described above to carry the local television network signals. These channels are only required in small areas called Designated Market Areas (DMA), and so the narrow spot beam architecture fits the need well.

A third advantage of broadcasting over the Ka band is that uplinks can be provided from within the spot beam, to allow for true local-in-local programming. The possible applications for local-in-local programming are explained in further detail below with reference to FIGS. 16 and 17.

Embodiments of the present invention are directed to a DTH satellite communications system that provides several advantages as compared to current generation systems, including capabilities for (i) receiving a far greater variety of national and local real-time programming (television programs), (ii) receiving non-real-time programming delivered asynchronously for later playback as a video pump, and (iii) utilizing a satellite return channel as a persistent connection. Operation over the Ka band is not required for provision of the satellite communications system described herein, and many embodiments that are described and claimed are not intended to be limited as such, but are described as operating over the Ka band only as a preferred embodiment.

Schematic Representations of a DTH Satellite Communications System

Figure 2:
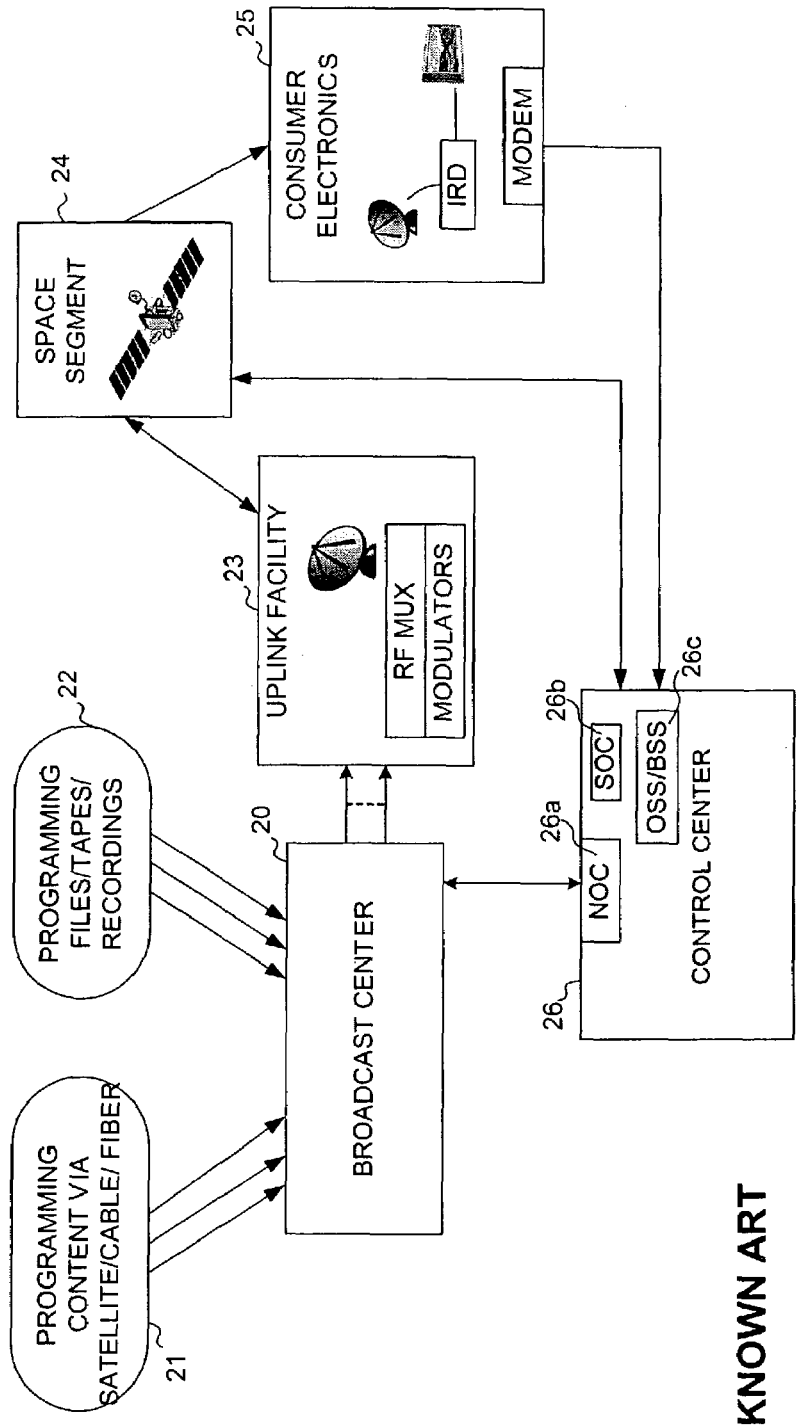
FIG. 2 is a schematic representation of a known direct-to-home (DTH) satellite broadcasting system.

FIG. 2 provides an overview of the major components of a known satellite communications system for providing direct-to-home (DTH) entertainment programming via satellite. The system is comprised of four major components—a broadcast center 20, uplink facility 23, space segment 24, and consumer electronics 25, and each of these components will be described with reference to this and the ensuing figures.

Source materials, including analog and digital audio/video feeds from a number of sources and in a multiplicity of formats, are delivered to the broadcast center for transmission over the uplink facility 23. Particularly, known DTH systems receive both real-time programming content via a satellite and cable/fiber feed 21 and data files, tapes, recordings, or any other format for receiving asynchronous data 22. The content is then encoded, encrypted, and multiplexed with other content in the broadcast center 20, as will be described with greater detail with reference to FIG. 3. The multiplexed signals are then modulated and amplified for transmission at the uplink facility 23, as will be further described with reference to FIG. 4. This is controlled by the Network Operations Controller (NOC) 26a in the control center 26.

The DBS satellite in space segment 24 "transponds" or frequency translates and amplifies the signals and retransmits the signals to Earth in the 12.2-12.7 GHz Ku band beam bandwidth. This type of satellite is commonly referred to as a "bent pipe" satellite. The Satellite Operations Center 26b in control center 26 maintains the satellite in geo-synchronous orbit using telemetry and control systems.

Consumers receive the broadcast signal via an 18-inch reflector antenna (satellite dish). The signal is downconverted and amplified to drive a coaxial cable to an integrated receiver decoder (IRD), as will be described in further detail with reference to FIG. 5.

Figure 3:
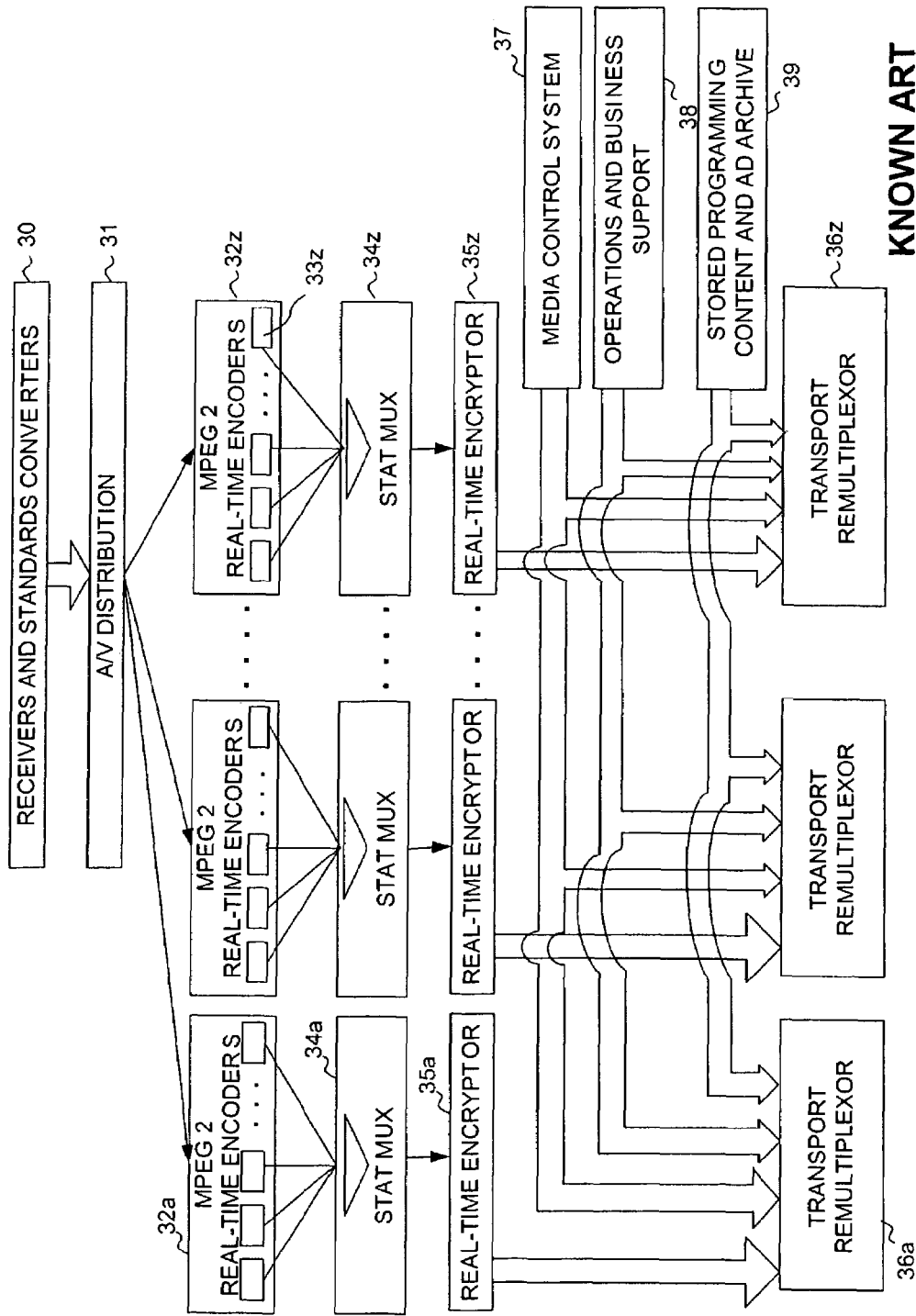
FIG. 3 is a schematic representation a known broadcast center for the system of FIG. 2.

FIG. 3 is a schematic representation of the primary components within a broadcast center 20 in a known DTH satellite broadcasting system. Content from analog and digital audio/video feeds is fed into a number of satellite and off-air receivers/converters 30. The baseband feeds can be processed as necessary to convert to different formats to simplify the subsequent distribution. From there, an A/V Distribution System 31 switches both analog and digital baseband signals to the inputs of MPEG-2 real-time encoder banks 33a-z, arranged in multiplexed groups. Each group consists of a number of real-time encoders 33a-z. The real-time encoders compress the signals and generate Packetized Elementary Streams (PES).

Each of the banks 33a-z encodes signals that are to be "transponderized" into one of the 24 MHz transponders (up to 32 transponders). A 500 MHz satellite beam bandwidth contains up to 32 (16 per polarization) QPSK modulated "channels," each one carrying a 25 to 30 Mbps MPTS bitstream with up to 12 television channels per MPTS.

Output from the encoders is fed into one of the statistical multiplexers 34a-z, one for each modulated "channel." The statistical multiplexer adjusts the individual encoder bit rates based upon program content, thereby aggregating the bit rate of the group of signals. In other words, for the total number of signals that are to be multiplexed together, the statistical multiplexer determines how to allocate the total available bandwidth, primarily based upon the minimal requirements for different programming carried on the modulated "channel." As an example, greater bandwidth is typically allocated to a sports program, since the entire screen image (key frame) is continually updated nearly every second, as opposed to a dramatic movie, in which a screen background may be constant for at least several seconds at a time. The output of the statistical multiplexer is a multi-program transport stream (MPTS), which consists of a number of separate services or programs, service information data and control data, time division multiplexed (TDM) into a single bitstream for each transponder.

A real-time encryptor 35a-z, one for each group, encrypts the signal and adds transport-level conditional access control information (e.g., basic/preferred/premium channel, pay-per-view code). The location of the encryptor depends upon the configuration of the statistical multiplexer. Particularly, some statistical multiplexers determine the optimal encoding rate according to information provided in MPEG packets. In this case, the encryptor must be located after the statistical multiplexer. Other statistical multiplexers communicate directly with the encoder and receive information without having to inspect MPEG packets. In this case, the encryptor can be inserted between the encoder and the statistical multiplexer. Most encryptors can look for individual services inside the MPTS using PID filtering techniques, and encrypt individual services with different keys.

A transport remultiplexer 36*a*-*z* (or remux) selectively combines services from the incoming encrypted multi-program transport stream with additional system information from Media Control System 37 and Operations and Business Support Systems 38, and adds other programs and ads streaming out of a video server 39. As with the statistical multiplexer, the remux is capable of adding or dropping individual services or programs and adjusting the bit rates of the original MPEG streams so that information can be transmitted in the multiplex within the maximum bandwidth allocation. Media Control System 37 provides control data such as an electronic on-screen program guide, a scheduler/bandwidth manager, software updates, etc. Operations and Business Support Systems 38 may include control data pertaining to subscriber management, digital rights management, or network management. Finally, stored content 39 may include video servers, ad archives, and any other stored content.

Figure 4:
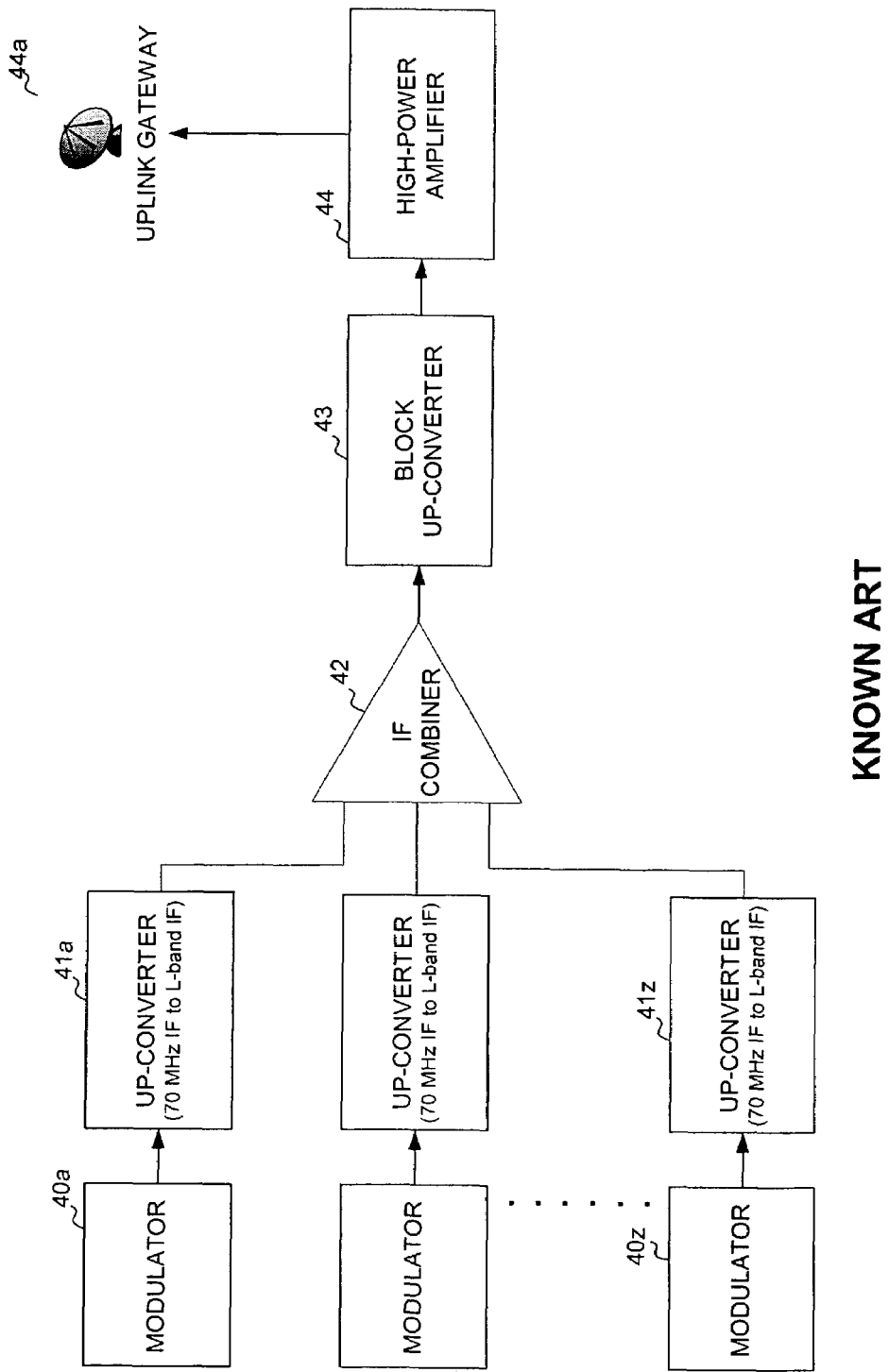
FIG. 4 is a schematic representation of a known uplink facility for the system of FIG. 2.

FIG. 4 is a schematic representation of the uplink facility 23 in FIG. 2. For each multiplexed bitstream, a modulator 40*a*-*z* applies forward error correction (FEC), applying a Reed-Solomon code followed by interleaving and then a convolutional code. The final bitstream is input to a quadrature phase shift keying (QPSK) modulator as specified in the DVB-S standard. The modulated signal is then fed to a first up-converter 41*a*-41*z*.

The translated signals from the different multiplexed bitstreams are then combined in combiner 42 and then upconverted in block up-converter 43, where the signals are translated to a suitable transponder frequency. This is then amplified in a high-power amplifier 44 to provide the necessary gain and matching to drive the satellite dish at the uplink. Finally, as can be seen in FIG. 4, the output of the high power amplifier is fed into a single uplink gateway 45 for transmission to the satellite.

It is important to note that while only a single uplink gateway 43 is utilized in any particular location for transmitting signals for multiple transponders, a separate set of encoders, statistical multiplexers, encryptors and remultiplexers, one for each "channel," are required in the broadcast center, and likewise, a separate set of modulators and up-converters also are required at the uplink facility. This is a significant example of the inefficiencies that are encountered in conventional DTH satellite broadcasting systems.

Figure 5:
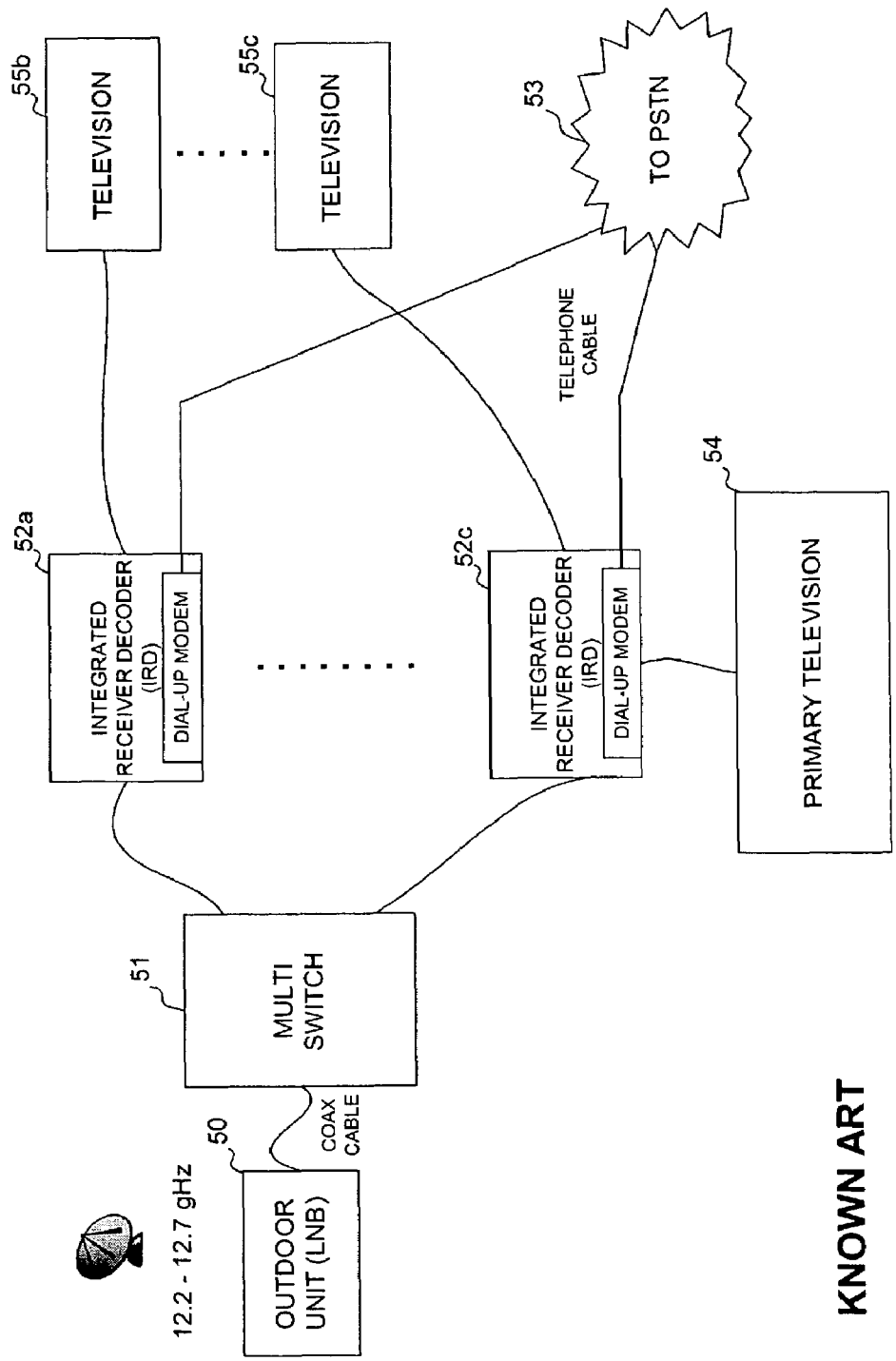
FIG. 5 is a schematic representation of consumer equipment for accessing the system of FIG. 2.

FIG. 5 illustrates consumer electronics 25 that are required for receiving DTH satellite signals at consumers' homes. Once the 12.2 to 12.7 GHz beam signal is received at the 18-inch reflector and offset by the low-noise block (LNB) downconverter 50, it is switched in multi-switch 51 and translated and amplified to drive the coax to an Integrated Receiver Decoder 52. The IRD basically reverses the uplink process, consisting of (i) a tuner that selects one of the transponders, (ii) a QPSK demodulator that extracts the baseband MPTS bitstream, (iii) a forward error correction decoder that removes the concatenated FEC, (iv) a demultiplexer that extracts the selected service (audio and video PES) from the MPTS, (v) a decryption engine to determine whether the subscriber is authorized to receive the programming and (vi) a decompression engine that processes the MPEG-2 video and audio signals and produces baseband analog or digital signals for display on television sets. Finally, the IRD typically includes a dial-up modem that is used to report usage and transactions back to the uplink facility. The usage data is received by the Operations and Business Support systems and is used for account reconciliation, subscriber management, and diagnostics. As shown in FIG. 5, a separate IRD is provided for each television 44, 45*a*, and 45*b* in the home, such that viewers of different televisions can tune to different channels.

In a current-generation DTH satellite broadcasting system, which utilizes the "transponderized" or "channelized" communications protocol, a separate tuner is required in an IRD for each incoming signal that is to be viewed or recorded. Therefore, at least two tuners are required if a consumer wishes to record a different channel than the one being watched. Further, as described above, for a household with a plurality of televisions, a separate IRD is required for each television, assuming that a different signal may be desired at different televisions.

Figure 6:
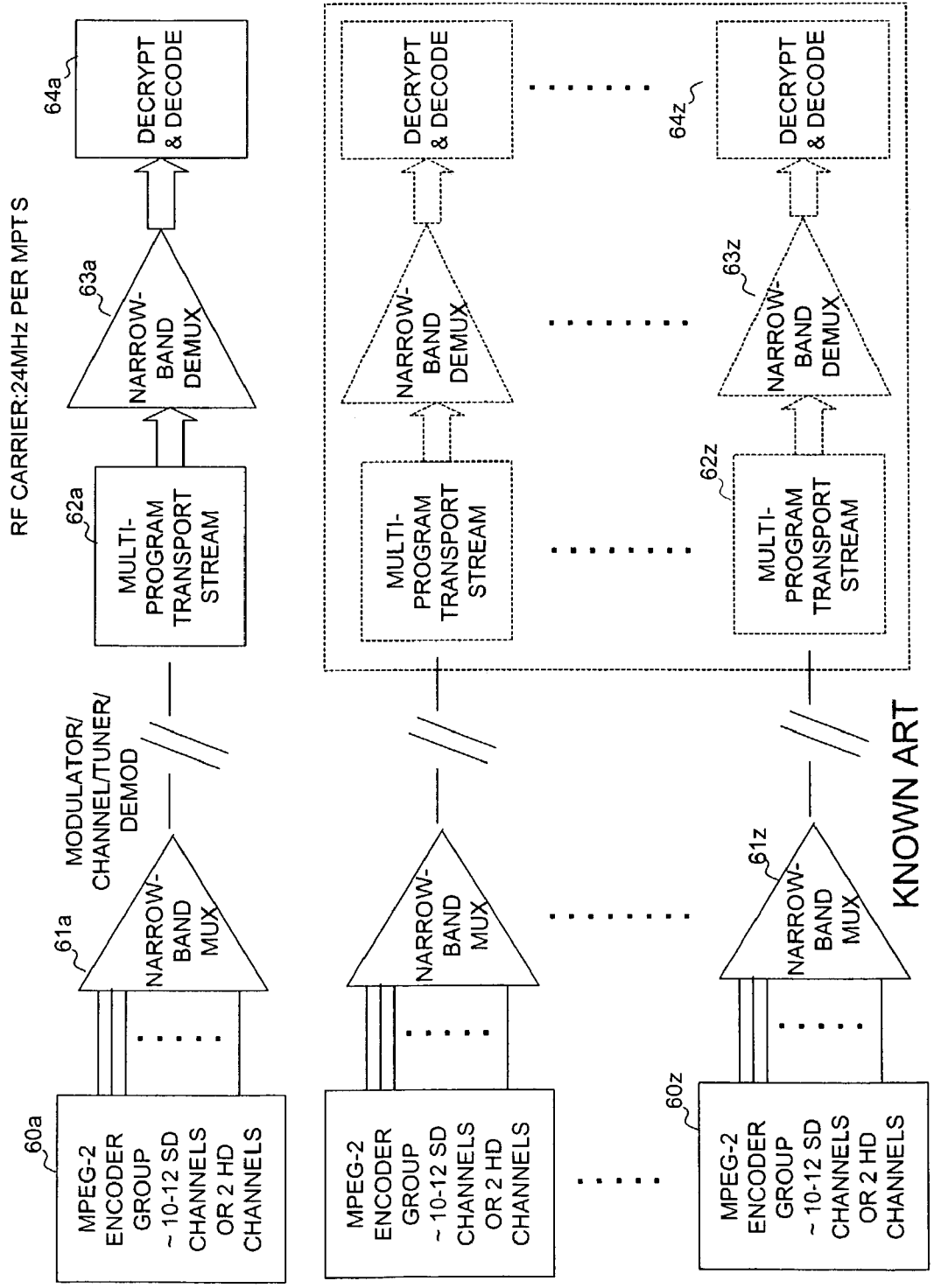
FIG. 6 is a diagram illustrating the broadcast transmission of real-time programming utilizing a known narrowband communications protocol.

FIG. 6 is a schematic diagram that represents an overview of how content is transmitted in a current-generation, narrow-band DTH satellite broadcasting system. Signals are distributed to groups of encoder banks 60*a*-*z* to be encoded into MPEG-2 format. Under the "transponderized" approach, also known as "narrowband," approximately 10-12 signals for standard definition format television channels or 2 signals in high definition television format, can be combined together for transmission over a single 24 MHz transponder carrying a 25-30 Mbps MPTS bitstream. For each transponder "group," the output from the encoder banks are fed into respective narrowband multiplexers 61*a*-*z*, as described above with reference to FIG. 3. The output of a statistical multiplexer is an MPTS with bit rates ranging from 0.5 to 4 Mbps per program. The statistical multiplexer also inserts system information in table form from two tables (not shown). A Program Association table (PAT) identifies which programs are included in the MPTS. A Program Map Table (PMT) is used to identify which elementary streams are associated with each program.

The signals are then modulated and transmitted over respective channels as a series of multi-program transport streams 62*a*-*z*, each constrained by the 24 MHz transponder bandwidth. On the consumer side, a user presses a remote controller unit to request a particular television channel, and this tunes the IRD to receive only that bitstream. A demultiplexer 63 reads tables that identify the transport structure, extract individual programs and send them to decryption and decode electronics. Therefore, the demultiplexer typically supports only a single session consisting of a single program or service. In the meantime, the other signals within the narrowband multiplexer, and the signals that are sent over other respective narrowband multiplexers, are not received in the IRD. Since it is unlikely that a consumer will view any particular broadcasted content, television broadcasters rebroadcast content multiple times, with the hopes that viewers will tune to receive the content on at least one occasion.

Figure 8:
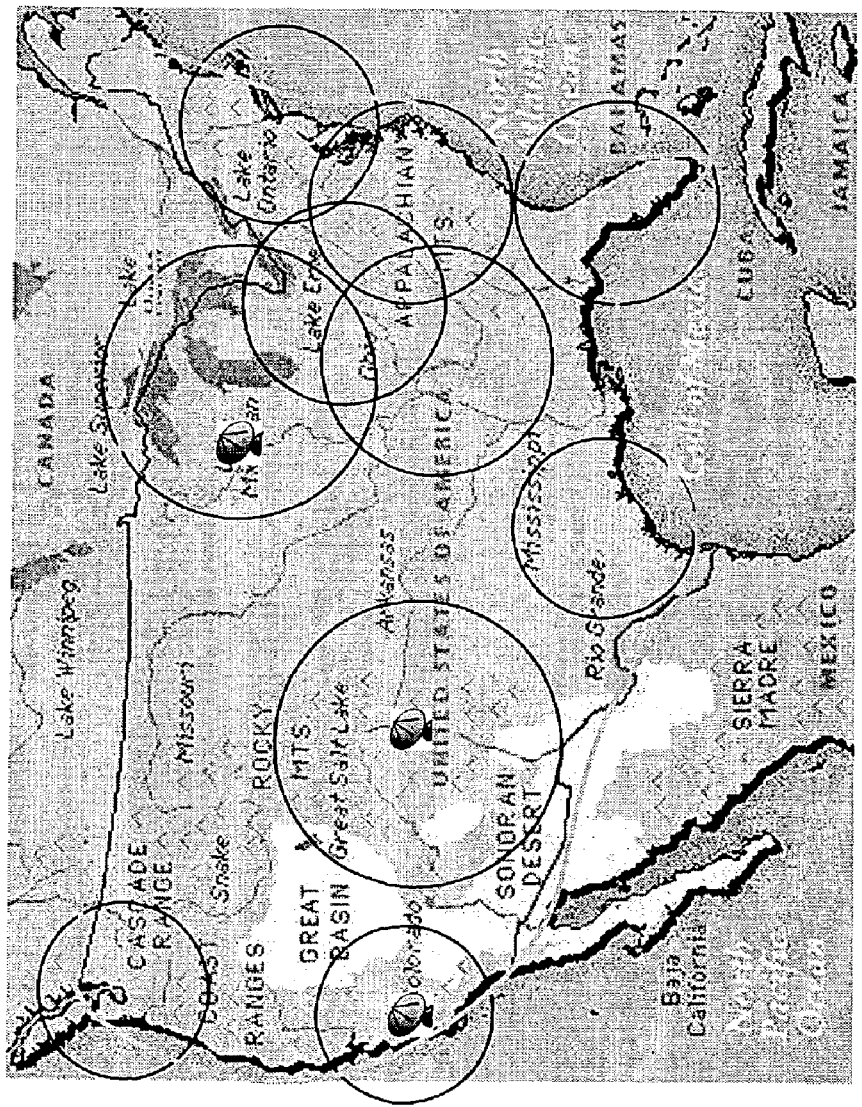
FIG. 8 is an illustration of spot beam coverage in a known satellite communications system.

Effective Jan. 1, 2002, the Satellite Home Viewer Improvement Act (SHVIA) requires a satellite carrier providing local television signals into any television market to carry all local television stations in that market in a non-discriminatory manner. Historically, satellite broadcasters such as DirecTV and Echostar provided local television retransmission to about 40 Designated Market Areas (DMAs) each, carrying only the top 3-5 television stations in each market. In late 2001, both DirecTV and EchoStar launched spot beam satellites designed to allow them to serve up to 50 television markets with local television signals while complying with the carry-one-carry-all requirements of the SHVIA. FIG. 8 is an example of how spot beams are used in conventional satellite broadcasting systems to provide local television signals to certain DMAs. Note that the spot beams are of different sizes and are overlapping around population centers. Although an ideal local satellite broadcasting scenario is to have beams that are the exact size of the DMA, this approximation has been used in conventional local spot beam arrangements due to lack of spectrum, an inherent limitation in the "transponderized" approach.

Wideband Communications System Overview

Figure 9:
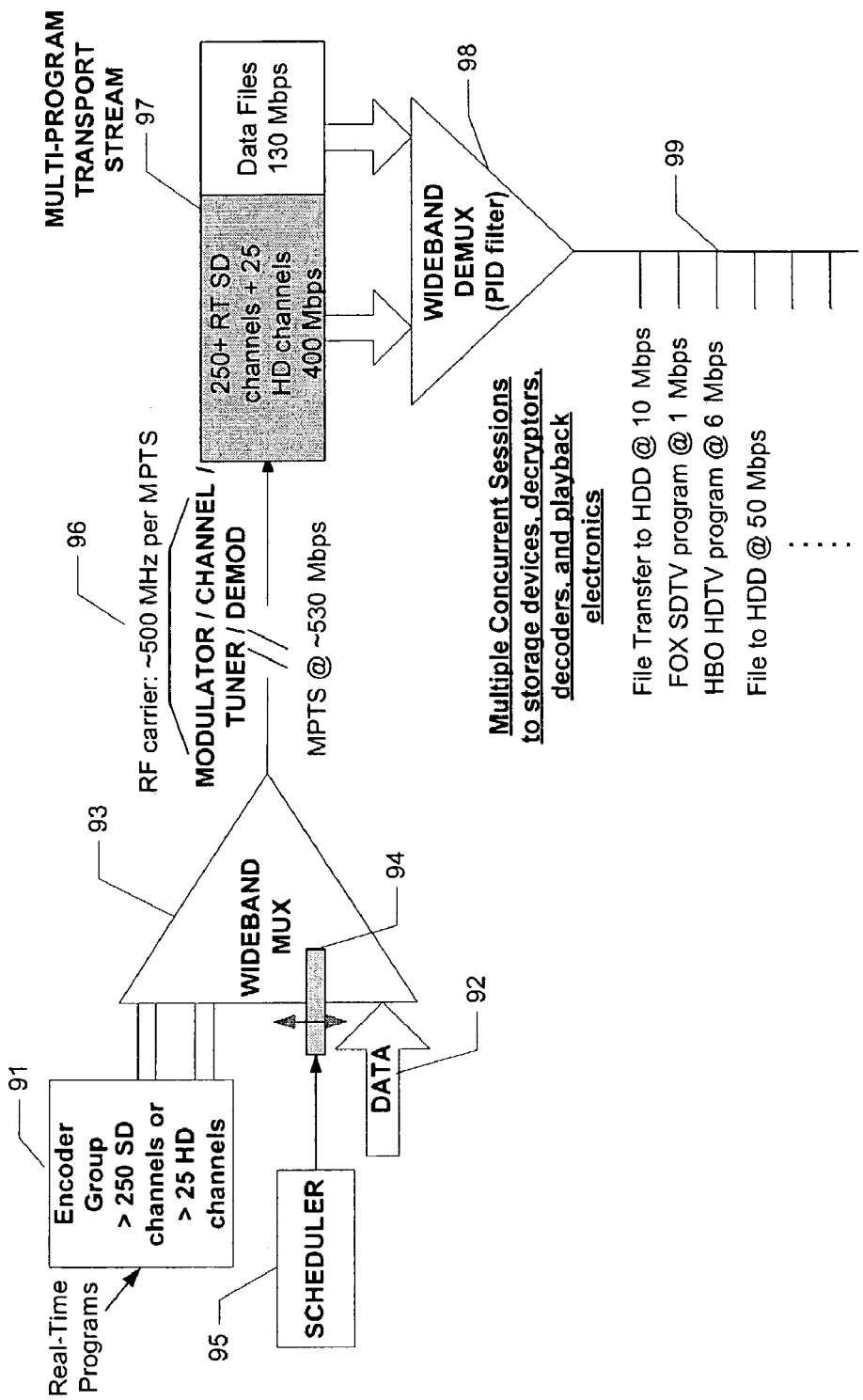
FIG. 9 is a diagram illustrating the broadcast transmission of real-time and asynchronous programming utilizing a wideband communications protocol, as an exemplary embodiment of the present invention.

In an embodiment of the present invention, a satellite communications system is provided in which content is no longer distributed into a series of statistical multiplexers for 32 different, discrete "channels" or "transponders." Instead, a single multiplexer is utilized to receive all of the signals, allocating the complete available bandwidth (within the Ka band, in the preferred embodiment) as a single "channel." An overview of this communications protocol for a next-generation broadcast center for a DBS is now described with reference to FIG. 9.

Instead of having groups of real-time encoders for respective transponders, all of the encoders 91 are provided together in a single group, for encoding in excess of 220 standard definition television channels or 25 high definition channels of real-time programming information. The encoder group creates digital, packetized elementary streams, which are then fed into a wideband statistical multiplexer 93. The multiplexer additionally receives non-real-time (or asynchronous) content, provided as files stored on disk or tape, in data server 92. This content can be delivered as downloaded files of various bit rates or for different playout schedules.

In addition to or instead of hardware-based encoders, a software-based encoding system can also be provided, which are rapidly reconfigurable to support different encoding and compression standards. A software-based encoder (or "soft decoder") uses software algorithms or specialized digital signal processing circuits or media processors that accelerate the algorithms used for video and audio compression, yet afford the quick reprogrammability of software based equipment. In order for the decoder to quickly identify and switch decoding algorithms on a per program basis, the encoder needs to insert information in the transport stream specifying which encoding or compression standard was used on that particular program or content.

By transmitting real-time programming much more efficiently through wideband communications, extra bandwidth becomes available for additional channels of real-time programming. Additionally, the extra bandwidth allows for asynchronous, high-speed delivery of files over satellite for populating memory in consumers' hard drive memory with capability for on-demand programming. As will be described below in greater detail, this "video pump" enables the delivery of files without necessitating repeated real-time delivery of syndicated programming, or repeated playback of movies every half-hour, as is currently done in DTH or digital cable systems. By eliminating the repeated delivery of the same file, additional bandwidth is freed for asynchronous delivery of other files and programs. Further, the available extra bandwidth at any given time can be used for downloading asynchronous files, perhaps at slower-than-real-time, for populating a consumers' set-top box memory, for later playback. In this instance, the total bandwidth is completely allocated so that none is wasted.

Returning to FIG. 9, the wideband statistical multiplexer 93 performs two interrelated functions: statistical multiplexing of real-time video feeds and the instantaneous blending of real-time and non-real-time content, to maximize the utilization of the wideband transport stream. The non-real-time content can then be stored on a storage device at the consumer's side, thereby enabling the consumer to schedule playback of the stored file. The statistical multiplexing function is similar to that described earlier, but is based upon a much larger number of television channels resulting from a more efficient utilization of the wideband multi-program transport stream.

The statistical-multiplexer controls a conceptual "movable boundary" 94 between content destined for real-time delivery and non-channelized content destined for asynchronous delivery. This boundary represents how 500 MHz of total available bandwidth is allocated, or shared, between real-time delivery and non-real-time content at any given time. The allocation can change dynamically, based primarily upon the bandwidth requirements of the particularly scheduled real-time content. The "blending function" is also based upon the quality of service (QoS) for each file.

The "scheduler" 95 is an application that assigns a start time and a channel to real-time content and assigns quality of service and delivery requirements to files designated for delivery over the video pump. A sample schedule is as depicted in the following table with "RT" designating real-time content, and "F" designating files to be delivered. The QoS and Delivery time parameters can be specified based on a variety of factors, including service level agreements with content and service providers.

| Program | Start Time | Duration | Channel | File Size | QoS | Delivery Time |
| --- | --- | --- | --- | --- | --- | --- |
| RT1 | 7:00 PM | 1 hour | 12 | | | |
| RT2 | 9:00 PM | 2 hours | 114 | | | |
| RT3 | 11:00 PM | 2 hours | 85 | 900 MB | A | |
| F1 | | | | 900 MB | A | A |
| F2 | | | | 450 MB | C | C |
| F3 | | | | 6000 MB | B | C |

As can be seen in the table, six programs are scheduled; three of which are to be broadcast as real-time programming and three are scheduled for asynchronous file delivery. Since the three real-time programs (RT1-RT3) are to be viewed according to a conventional television program schedule, these programs are scheduled to begin at certain respective times and for particular durations (a time slot) on particular channels. Since program RT3 is to be provided via streaming video, it is additionally associated with a file size and a QoS parameter. The three programs that are scheduled for asynchronous file delivery are each associated with a file size, a QoS parameter, and a delivery time (or time slot). In this schedule, for example, programs F2 and F3 will be time division multiplexed for delivery during the same time slot.

Returning to FIG. 9, the wideband satellite channel is illustrated as comprising a 500 MHz transponder 96 transmitting a waveform described by a variant of the DVB-S standard, and specifying Turbo code forward error correction followed by interleaving and a convolutional code prior to QPSK modulation. Since there is no reason to sub-divide the satellite bandwidth into a number of sub-channels, each transponder can now carry a waveform modulated by a single, wideband MPTS. The tuner and demodulators 96 receive, frequency translate, error correct and demodulate the wideband satellite waveform and regenerate the wideband MPTS, which is composed of a blend of real-time and non-real time content.

The wideband demultiplexer 98 in the client terminal reads the tables that identify the wideband transport multiplex and extracts several individual program streams simultaneously 99 from the MPTS 97, each of which may be broadcast at a different bit rate. One important difference between this system and the prior art system is the ability of a packet identifier, or "PID" filter 98 to handle several concurrent sessions to feed several sets of playback and record electronics in the household. Another difference is the processing power and flexibility of the demultiplexer to orchestrate the delivery of several bits streams of multiple rates to several output ports, much like a high-speed network switch.

Yet another distinguishing feature of the wideband demultiplexer relates to an ability to throttle (adjust or meter) the speed of the data channel to the hard drive to maximize the number of concurrent read and write sessions. (Typically, part of the throttling mechanism includes a buffer or FIFO and a controller.) The single program transports streams generated by the wideband multiplexer are sent to local and remote playback electronics as well as to hard drives. All transport streams are generated in encrypted form to reduce the risk of service theft. Decryption and decoding engines at the final play devices decrypt the content and convert it back to baseband video and audio for presentation on television sets.

Figure 10:
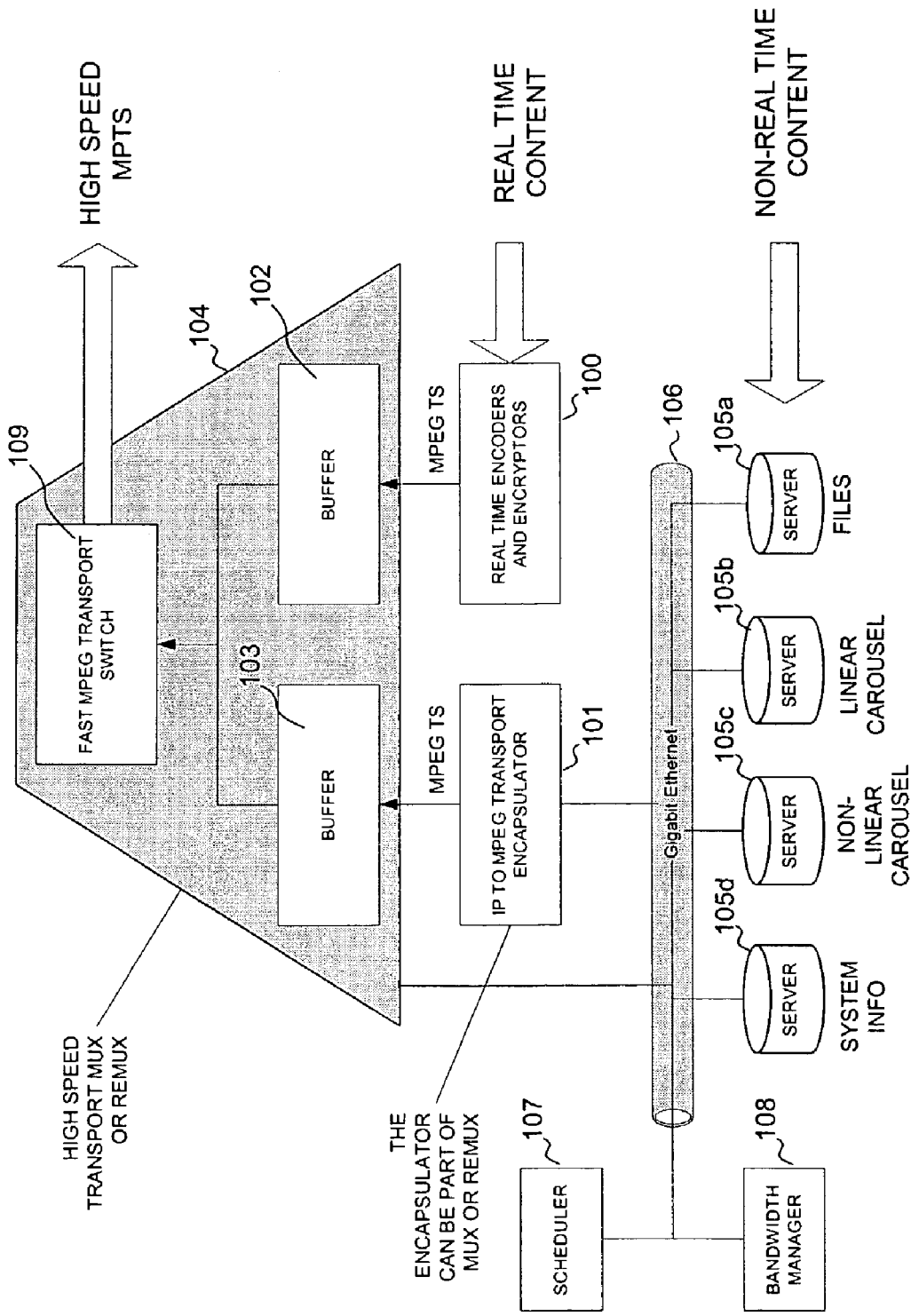
FIG. 10 is a schematic diagram illustrating the transmission of real-time programming and asynchronous data into one multiplexer in a non-channelized architecture of a wideband communications protocol, as an exemplary embodiment of the present invention.

FIG. 10 illustrates in greater detail the input of real-time, non-real time, and control data into a wideband multiplexer in accordance with an embodiment of the present invention. As also shown in FIG. 9, a series of real-time encoders and encryptors 100 receive a real-time feed and prepare the digital signal for broadcast as part of a multiplexed signal over the satellite network. This programming content is fed into a set of buffers 102 within the multiplexer 104 until insertion into the stream. Simultaneously, according to both the amount of remaining bandwidth as determined by the bandwidth manager 108 and the resulting programming schedules in scheduler 107, non-real-time content that is populated in file servers 105a, linear and non-linear carousels 105b, 105c, and control data system information 105d is transmitted over a gigabit Ethernet to an "IP to MPEG transport encapsulator" 101 and fed into another set of buffers 103 within multiplexer 104. Based upon the scheduler and the bandwidth manager, the packets in buffers are switched by a fast MPEG transport switch 109 to become a high speed MPTS.

Figure 7:
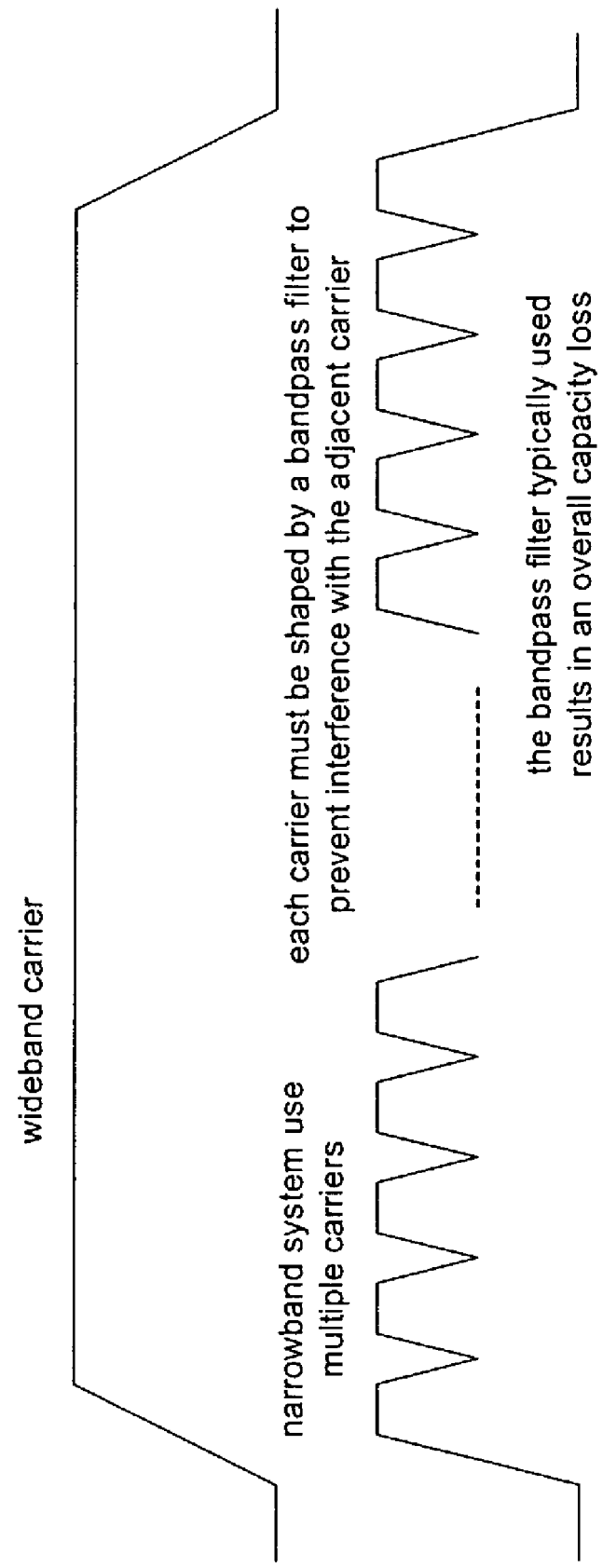
FIG. 7 illustrates inefficiencies inherent in utilizing the known narrowband communications protocol of FIG. 6.

Comparing the wideband communications format with the conventional narrowband format, it becomes readily apparent that there are several inefficiencies associated with a "channelized" approach. As can be seen in FIG. 7, a narrowband system uses multiple carriers, and each of these must be shaped by a bandpass filter to prevent interference with an adjacent carrier. The bandpass filter creates what is known as "guard bands," which are frequency ranges that are unusable for satellite broadcast transmission. Over the course of 32 channels, or transponders, the bandpass filter typically results in a 10% capacity loss.

Another serious limitation on the narrowband approach is that certain information must be redundantly provided in each channel, using additional bandwidth capacity. Particularly, referring to FIGS. 2, 5 and 6, since an integrated receiver decoder (IRD) 52a-52c in the consumer electronics typically contains a single tuner, thereby allowing a user to synchronize to only a single television channel at a time via narrowband demultiplexer 63a, program guide information must be provided by the Media Control System 27 into each transport remultiplexer 26 for each transponder. Without providing this media control information in each transponder, the IRD would not be able to tune to another channel, decrypt and decode programs or services upon a request by the user. Since this media control data is transmitted only once for a wideband approach, this creates additional unused bandwidth that can be allocated to transmission of additional real-time programming or transmission of files for non-real-time, on-demand programs.

Schematics of a Wideband DTH Satellite Broadcasting System

Figure 11:
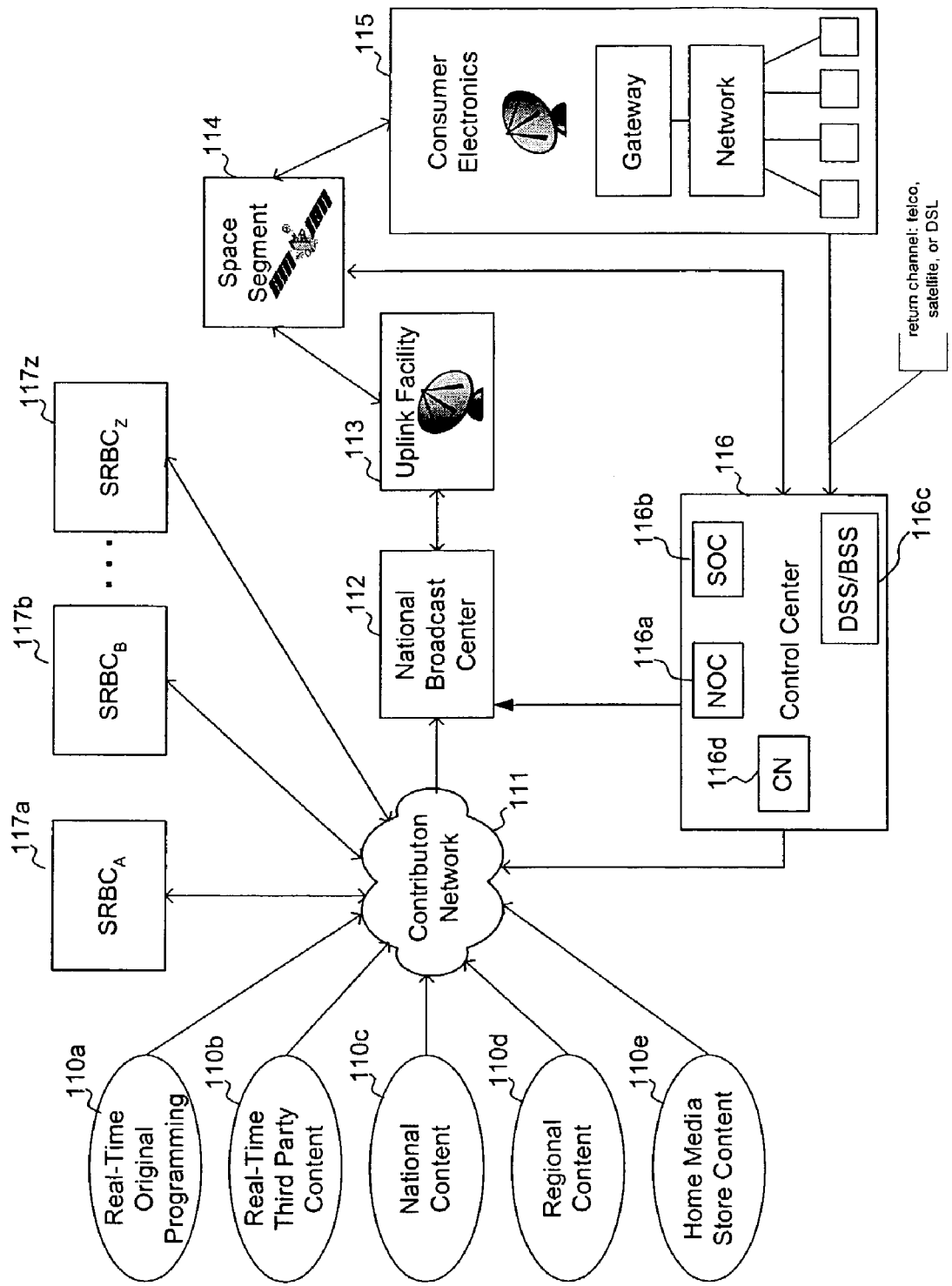
FIG. 11 is a schematic representation of a direct-to-home (DTH) satellite broadcasting system in accordance with an embodiment of the present invention.

FIG. 11 is a schematic representation of a DTH satellite broadcasting system according to an embodiment of the present invention. Similar to FIG. 2, a wideband satellite broadcasting system includes a broadcast center 112, an uplink facility 113, a space segment 114, consumer electronics 115, and a control center 116. However, the composition of these subsystems is different, and the system additionally includes a "contribution network" for integrating the broadcasting of additional types of media content.

In addition to real-time original programming 110a and national content 110c and regional content 110d, the combination of additional bandwidth afforded by a wideband carrier and certain advantages of transmission over the Ka band allows for delivery of third-party content 110b and "home media store," or "video pump" content 110e. Each of these feeds enters a "contribution network" 111, which coordinates broadcasting of these programs among a National Broadcast Center 112 and a plurality of regional broadcast centers (not shown in FIG. 11). Certain regional content may be provided directly by Super Regional Broadcast Centers 117a-z, which in turn forward the programming content to respective regional broadcast centers, or to the National Broadcast Center.

As in FIG. 2, the control center 116 includes a network operations center (NOC) 116a for controlling the broadcast center, and a satellite operations center (SOC) for performing telemetry with respect to the satellite(s) in space segment 114. Subscriber information is forwarded from consumer electronics to DSS/BSS 116c via a satellite return (not shown), or via a return channel over a PSTN, cable or DSL line modem. In FIG. 11, the control center additionally includes a contribution network controller 116d, for controlling operation of the contribution network.

Broadcast Center

Figure 12:
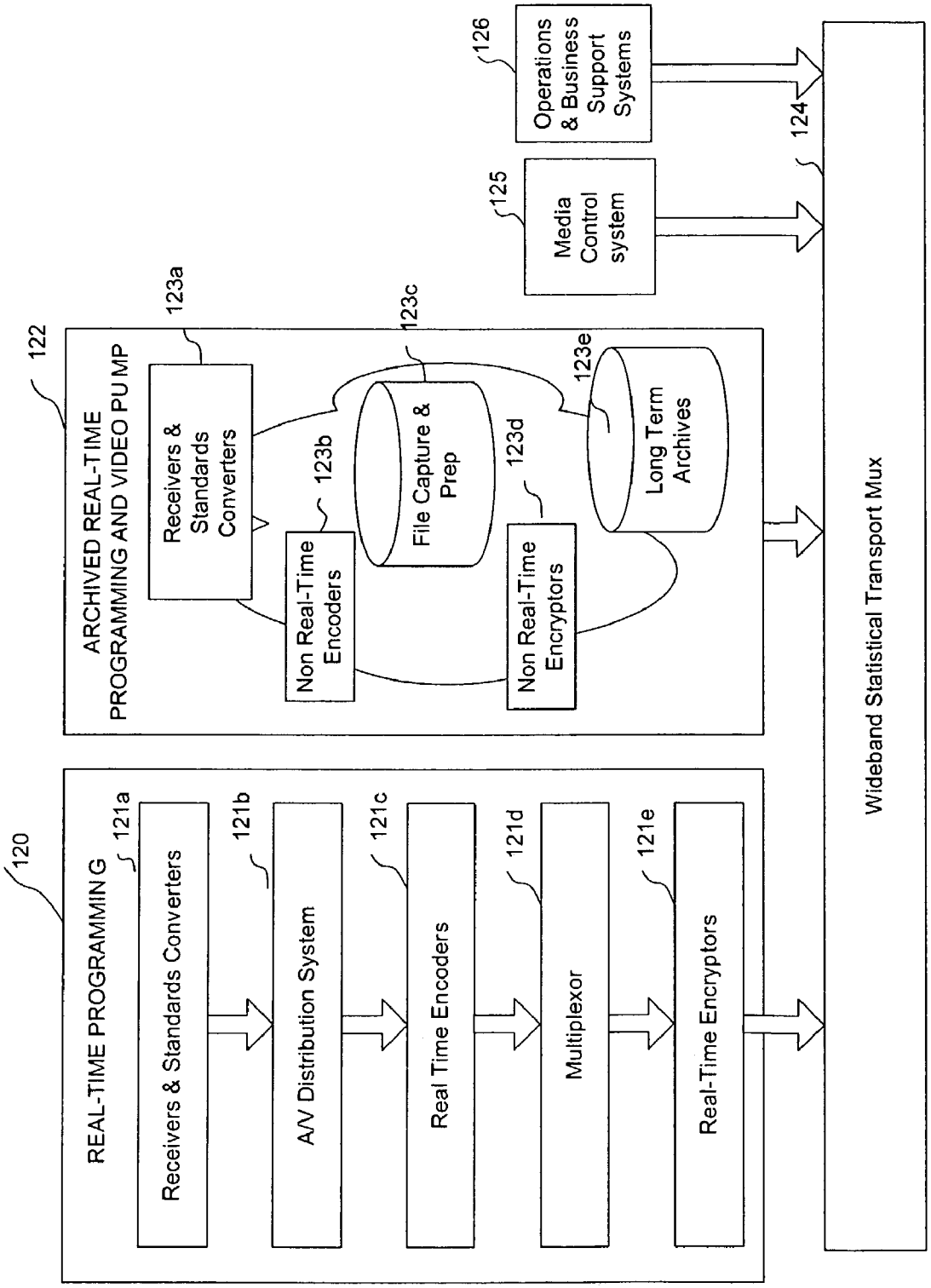
FIG. 12 is a schematic representation of a broadcast center for the system of FIG. 12, in accordance with an embodiment of the present invention.

FIG. 12 illustrates the broadcast center 112 of the wideband system of FIG. 11. As described with reference to FIG. 10, a wideband transport multiplexer creates an MPTS from a combination of real-time programming 120, archived real-time programming and video pump files 122, and control data from the Media Control System 125 and Operations and Business Support Systems 126. As in FIG. 3, real-time programming is received in receivers and standards converters 121a, where it is fed to an A/V distribution system 121b. However, in this system, all signals then go to the same set of real-time encoders 121c, to the same multiplexer 121d, and to the same real-time encryptors 121e, before being fed into the wideband transport statistical multiplexer 124. That is, instead of having a separate bank of encoders, multiplexers, and encryptors for each transponder, each are organized together. Either multiplexer 121d or the wideband transport multiplexer 124 can support statistical multiplexing.

With regard to the real-time encoders, it is worth noting that, resulting from the improved available bandwidth, media may be encoded in formats that demand higher-bandwidth complementary data streams, such as MPEG-7. MPEG-7 provides a comprehensive set of audiovisual description tools that provide easy, accurate access to content. This is provided through metadata specifications along with delivered content.

It enables high-performance content identification and fast, accurate, user-friendly, and personalized filtering, searching and retrieval. This is important for use with the wideband DTH communications system of the present invention, since with additional bandwidth and a "video pump" of stored programming, far more media choices will become available to the consumer. As described above, the encoders can be software-based to enable rapid reconfiguration to support different encoding and compression standards.

Returning to FIG. 12, the wideband transport multiplexer 124 additionally receives a feed from archived real-time programming and video pump 122. This information is received 123a and encoded 123b before being stored in a series of file capture databases 123c. Since archived and video pump files are not received in real-time, it is not necessary to encode the files in real-time. When the files are to be broadcast or downloaded, they are encrypted 123d before being sent to the multiplexer 124. Finally, as described with regard to FIG. 3, the wideband transport multiplexer receives control data from Media Control System 125 and OSS/BSS 126, although in this instance, the data is provided into a single wideband multiplexer 124.

Accordingly, as shown in FIG. 12, the "archived real-time programming and video pump" 122 in the broadcast center receives two types of files containing programming content. Archived real-time programming are files of programming content that will be fed into the wideband multiplexer 124 for real-time broadcast delivery to consumers. These packetized files must be delivered within the required bit rate associated with real-time programming. In contrast, the files for the video pump are to be broadcast in non-real-time to be viewed asynchronously by consumers. Depending upon the configuration of the video pump (described in further detail below), once this is stored in the memory of the consumer's hardware, this programming may be scheduled for viewing "on demand" or part of a psuedo-"broadcast" schedule, wherein the content is scheduled such that the consumer believes that the content is being broadcast in real-time.

Video Pump

A Video Pump service is a tool for delivery of pre-packaged or pre-programmed video files to subscribers' PVR hard drives (or other mass storage devices). The Video Pump can be utilized for providing asynchronous television services.

To provide asynchronous TV, three foundations need to be established. First, a PVR device with simple programming and usability features is required. Secondly, archives must be cataloged and made accessible. Digital formats are a must and fortunately, most movies and such are already written to MPEG-2 Master if they are in DVD format. MPEG-7's metatagging can be utilized as a significant component in this element—since the content must be locatable. Lastly, a ubiquitous high bandwidth "pipe" is important for providing asynchronous television. Downloading a movie from a cable modem or a DSL rate still takes from 30 minutes to a few hours, and subscribers are not willing to wait that long. The Video Pump satisfies the ubiquitous high bandwidth "pipe" requirement.

The intent of the Video Pump is to provide an ultra high-speed file delivery mechanism with package acknowledgements, DRM, etc., to enable VoD and other high-value entertainment applications. Even though the Video Pump is used in conjunction with "push" services, the ability to enable quasi-"pull" services like VoD is significant because it facilitates competition with Cable's circuit-switched model. By pushing the most likely purchased content into the subscriber's PVR, VoD is truly achieved. Cable's model requires 5000 T-1 circuits and servers for every 200,000 local subscribers. Video Pump and a large PVR require a 276 Mbps Video Pump for less than one minute to pre-position that same content to be delivered to millions of PVRs (or other mass storage devices).

Many new applications will be realized for this service once asynchronous viewing from PVRs becomes commonplace. A big challenge will be to find what the viewer wants from a catalog universe of millions of hours of stored programming. However, search capabilities such as provided by MPEG-7's metatagging "video search engine" technology will provide high-quality usability for videophiles. A top-level registration with demographics and lifestyle also might be required for push services.

Permission-based push technology ("If you liked A, you might B") and a package barker/preview channel on the CONUS DTH service become de rigueur. Opportunities for content producers and creators abound in an asynchronous delivery world. Thousands of hours of syndicated programming, documentaries, "how-to" and infomercials exist. Brand creators can build their relationship directly with consumers of the system. Packaging a ten-hour series of "Best-of" or "Top 100" of I Love Lucy or Hogan's Heroes and pushing it to 100,000 customers per month would create new streams of revenue from content. The complete works of Star Trek, M*A*S*H or Seinfield would be collectable to many.

New applications enabled by the video pump transport service also will enable advertisers to buy space directly on the consumer's hard drive. Using the persistent satellite return channel (described with reference to FIG. 14), the system can directly measure advertising viewing and facilitate a direct customer relationship. Viewing time and advertising will no longer be necessarily connected.

Uplink

Figure 13:
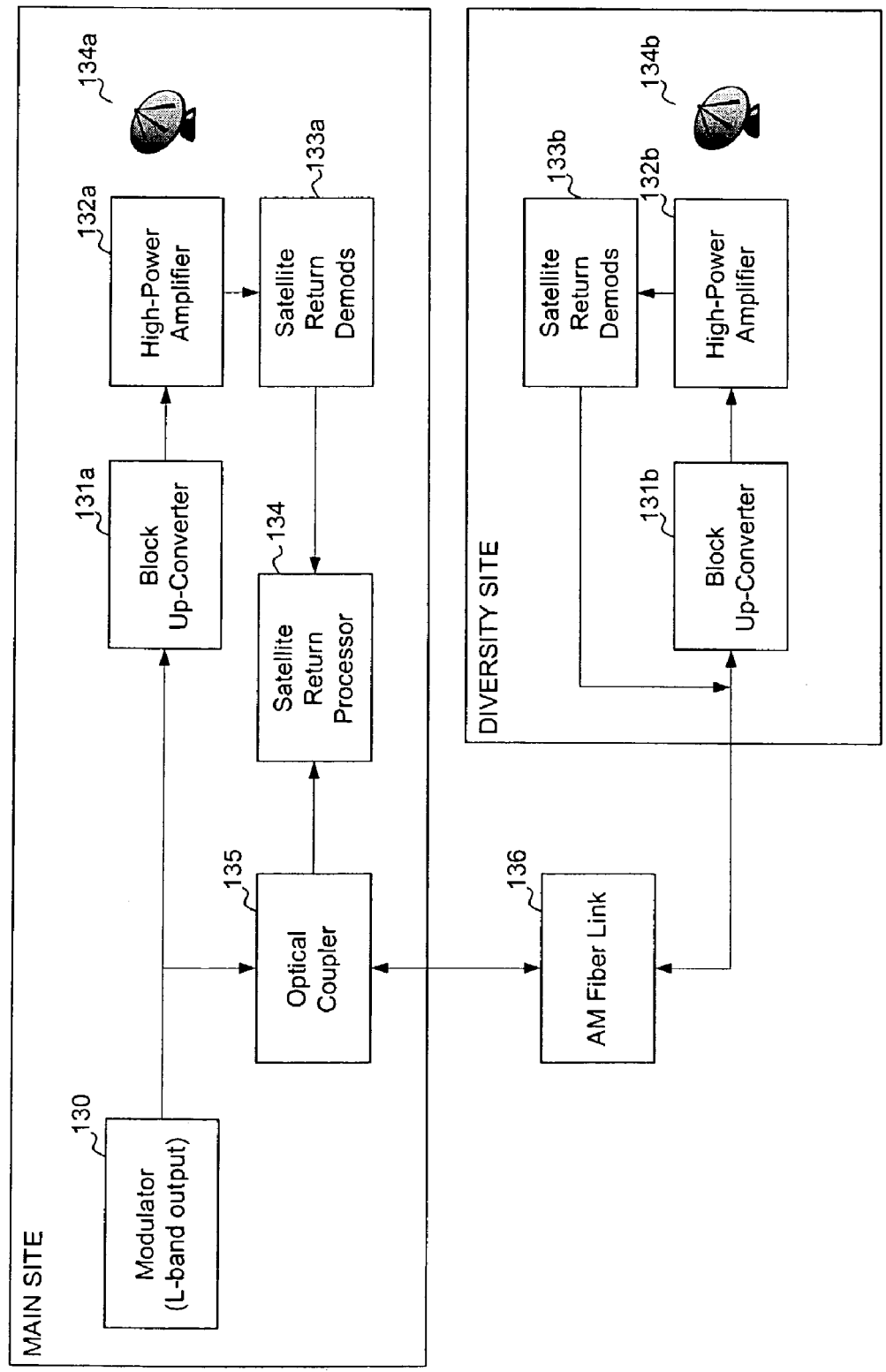
FIG. 13 is a schematic representation of an uplink facility for the system of FIG. 12, in accordance with an embodiment of the present invention.

FIG. 13 illustrates the uplink facility 113 connected to the National Broadcast Center in FIG. 11. Similar to the uplink facility shown in FIG. 4 for a narrowband system, the wideband system includes a modulator 130, a block up-converter 131a, and a high-power amplifier 132a, before being transmitted by the uplink gateway 134a. Since, as described with reference to FIG. 11, the satellite communications system of a preferred embodiment of the present invention may include a persistent satellite return channel from the consumer, the uplink may additionally include a satellite return demodulator 133a and a satellite return processor 134.

The uplink facility and broadcast center may additionally include a "diversity site" for transmitting the content to the space segment from another terrestrial location. For example, it may be useful to place a first uplink facility in a geographical location known for its arid climate (such as Nevada or Ariz.) and a second diversity uplink in another arid climate that faces a different weather pattern (such as southern California). Particularly, although there are certain advantages to utilizing the Ka band for DTH applications, satellite communications at that frequency band are often associated with rain fading and other environmental effects. To compensate for this, the uplink facility includes an optical coupler 135, which is connected via an AM fiber link 136 to a diversity site, containing a second block up-converter 131b feeding to a high power amplifier 132b and uplinking gateway 134b. Once again, to accommodate a return channel, a satellite return demodulator 133b is included, which feeds back to the AM fiber link 136 and to the optical coupler 135 of the main site.

Consumer Electronics

Figure 14:
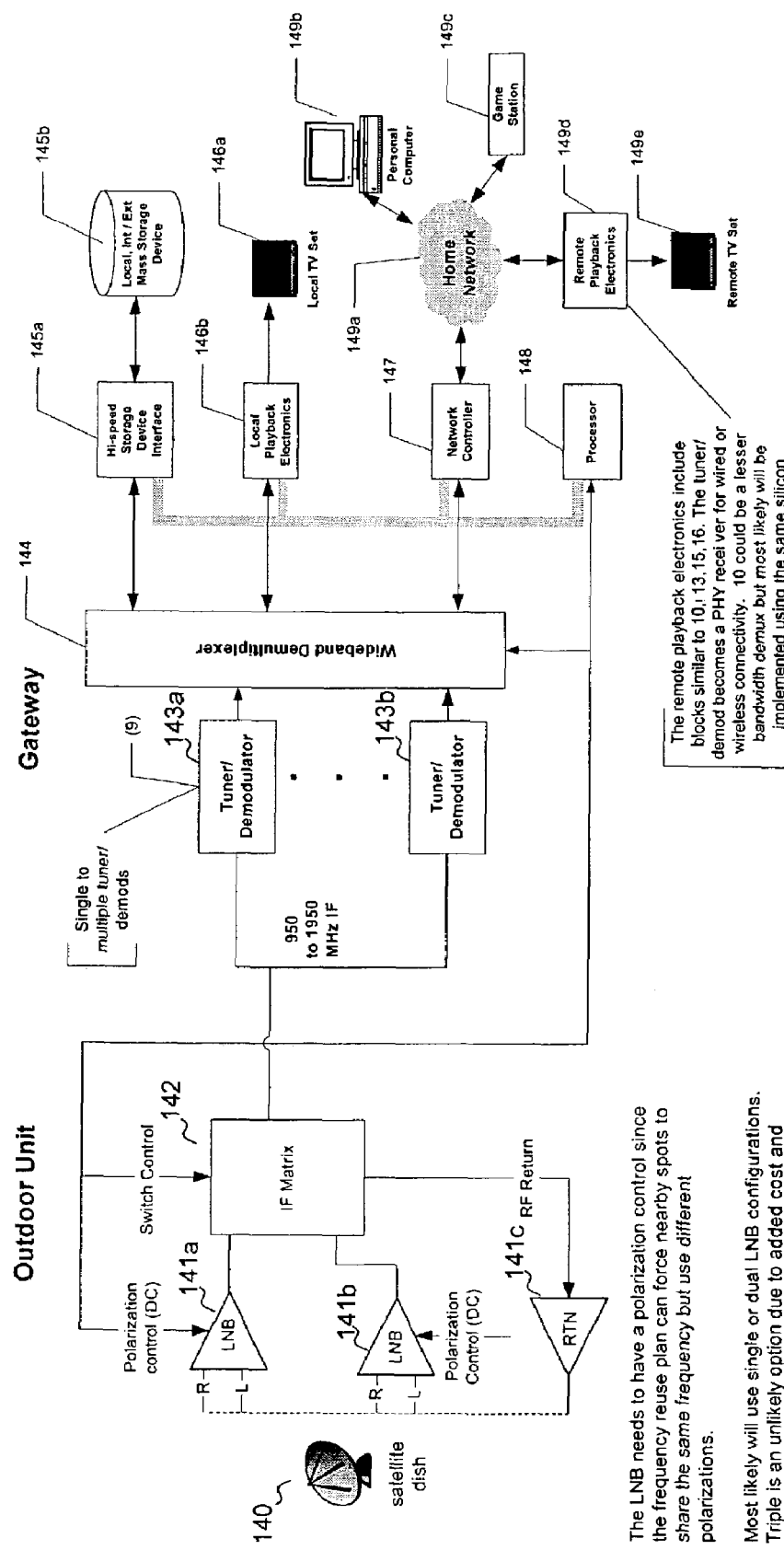
FIG. 14 is a schematic representation of consumer equipment for accessing the system of FIG. 12, in accordance with an embodiment of the present invention.

A schematic illustration of the consumer electronics that may be utilized as an embodiment of the present invention in connection with a wideband satellite communications system is now described with reference to FIG. 14. On the left side of the figure, labeled "outdoor unit," the satellite dish 140 is connected to one or more LNB (low noise block down-converter) units 141*a*, 141*b* to receive signals from different beams. As will be described in greater detail with reference to FIG. 15, the wideband satellite communications system can receive one or more CONUS beam for national content that is broadcast across the continental United States, and a regional spot beam for regional broadcast content that is specific to the designated market area, or DMA, associated with the consumer's location. Since the beam is transmitted with a left hand and right hand polarity, a polarization control is fed into the LNB units. The LNB units ten feed into an IF Matrix 142, which receives the signals. Finally, the outdoor unit also includes a return unit 141*c* for providing a persistent return connection from the consumer electronics system back to the broadcast center.

The right side of the figure provides the "Gateway," which connects to televisions 146*b*, computers 149*b*, game stations 149*c*, and other audio/video equipment within the home. Particularly, the received signals are fed into a tuner/demodulator 143*a*. The output of the tuner/demodulator 143*a* is the demodulated and error corrected MPTS in baseband digital format. The wideband demultiplexer 144, a digital "filter" that separates packets based upon packet IDs within a single transponder, subsequently processes this signal. Therefore, the gateway can tune and demodulate a plurality of the signals that are incoming through the wideband channel. This includes simultaneously tuning real-time programming with non-real-time video pump delivery of files for later playback.

Although only one tuner is required, other tuners 143*b* can be utilized for information broadcast on different transponders (such information received from other satellite beams). Likewise, the wideband demultiplexer 144 also can include circuitry to receive a plurality of MPTS's from a plurality of tuners. In this manner, adding tuners can increase simultaneous access to the bandwidth afforded by several incident beams.

In parallel with the "soft encoders" that can be utilized in the broadcast center, the gateway in the consumer equipment can utilize software-based decoders, or "soft decoders" to mitigate product obsolescence. These can be implemented using specialized media processors, although standard CPUs can be feasible, especially as faster standard architecture processors become available. The soft decoder enables decoding multimedia content encoded in a variety of encoding and compression standards. One important requirement is that the code space for the media processor be made upgradeable via software downloads from the broadcast center. It is feasible to have to switch codecs 'on the fly' as different material might be encoded with different codec (compression/decompression algorithm) variations.

As can be seen on the right side of the figure, the output from the demultiplexer is fed into storage facilities, playback units, and a network. Particularly, the output is received by a hi-speed storage device interface 145*a* for a local internal/external mass storage device 145*b*. To be effective, the mass storage device should be at least 50-500 GB to store hours, or even days worth of programmable content.

The output is also fed directly to local playback electronics 146*a*, such as one or more local television sets 146*b*. Although, as shown in FIG. 5, the consumer electronics for a conventional DTH system requires a separate tuner for each television to receive different programming, the gateway system can utilize a single tuner to provide different programming across different televisions. This is possible because of the wideband transmission of data allows hundreds of channels of programming to be carried over a single transponder.

The output may also be fed into a network controller 147, which can drive a home network 149*a* that connects to several additional devices or systems, including personal computers 149*b*, game stations 149*c*, or remote playback electronics 149*d* and remote television sets 149*e*. Analogous to a DSL line (but with much greater bandwidth and broadcasting capability), the wideband satellite DTH system can provide a host of programming and other types of data content for personal computers and other types of electronic equipment.

A main processor 148 connects to the wideband demultiplexer and the LNB units to control the system. Also, all of the devices connected to the demultiplexer are bi-directional to allow for communications across the persistent low-bandwidth satellite return 141*c*, which can be transmitted by a relatively small satellite dish 140 for communications over the Ka band.

Several advantages are associated with having a satellite return channel included in the satellite communications system of the preferred embodiment of the present invention. As shown in FIG. 5, each set top box in the consumer electronics of conventional DTH systems communicates with the satellite communications provider over the PSTN, via a dial-up modem. Since this utilizes a shared line for voice communications, the set top box initiates a communication to the satellite communications system typically during off-peak times (i.e., around 1:00 am-5:00 am) when members of a household are unlikely to be using the telephone line. Thus, for example, if a consumer orders access to a program on a pay-per-view station, the set top box will provide access to the station, but will not report the order back to the communications provider (to charge the subscriber's account) until the set top box is signaled to make a call. In contrast, having a persistent satellite return communication enables immediate processing of requests for services by subscribers, and additionally can be utilized for many other types of applications. As examples, subscribers can participate in interactive television-based shopping/auctions, interactive television programming, interact with other subscribers, etc.

Tiled Architecture for Spot Beams

Figure 15:
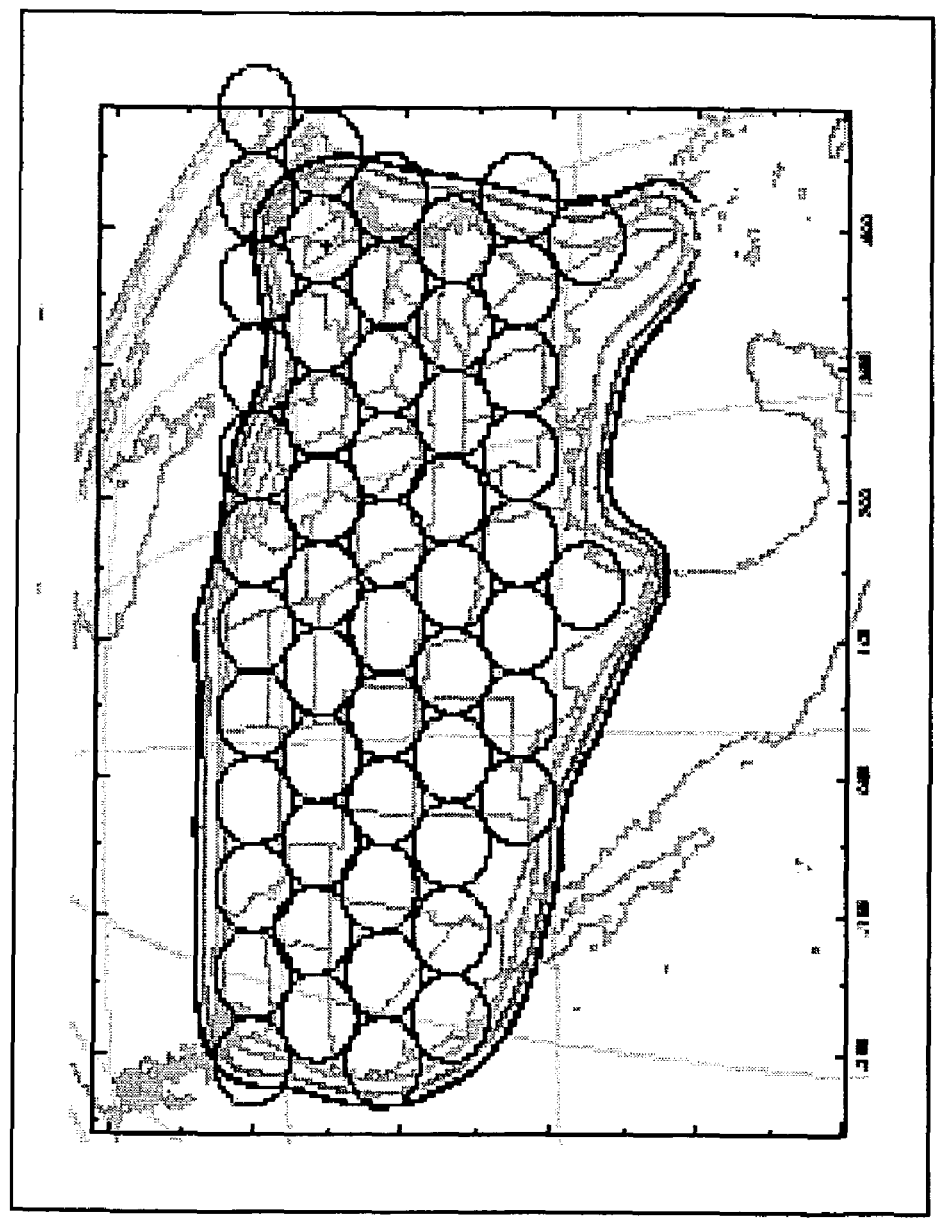
FIG. 15 is an illustration of spot beam coverage in a satellite communications system in accordance with an embodiment of the present invention.

As described with reference to FIG. 8, a conventional DTH satellite communications system employs a plurality of "spot beams" to provide regional broadcasting to certain designated market areas (DMAs). This is employed because through "frequency re-use," different programming content can be provided along the same carrier frequency in different spot beams that are directed to different geographical regions. As long as the spot beams are not contiguous, interference can be avoided. In the DTH satellite communications system according to an embodiment of the present invention, which employs the Ka band, a tiled architecture of regional spot beams is employed. FIG. 15 illustrates the overlaying of the CONUS beam with 54 spot beams, tiled across the continental United States. This can be provided via two satellites in the space segment, at least one providing a CONUS beam and each carrying 27 spot beam transponders. In that case, the two satellites generate 14,000 MHz (14 GHz) of usable bandwidth, 500 MHz each from a CONUS beam and 13,500 MHz from the combined 54 spot beams. With 500 MHz of bandwidth, the CONUS beam can cover the continental United States with 250 channels of direct-to-home television service. The 54 spot beams are layered on top of the CONUS coverage to provide local-into-local programming and other innovative entertainment-oriented services. The tiled architecture is made possible because of the additional bandwidth that is allocated in the Ka band, in addition to the advantages associated with maximizing bandwidth by utilizing the wideband format. With the tiled architecture, local programming can be provided for every location within the continental United States, for each location's respective DMA.

As will be described in further detail below, regional broadcast centers (RBCs) provide television local-into-local uplinking services into the spot beams. These RBCs are terrestrially connected to the NOC of FIG. 11 and are a part of the contribution network.

Regional Content

A regional DTH service can reach customers within the limits of a respective regional spot beam and offers local station rebroadcast (LIL), and locally-interesting programming. This can provide a new generation of locally-generated and broadcast content from a number of sources, including, but not limited to, local government, school systems, local business and special interest groups.

The additional bandwidth available in spot beams brings new opportunity for content creators. For a small bandwidth usage fee, a video content creator can potentially reach millions of households in a major metropolitan area, for example, New York, Los Angeles, Chicago, or Philadelphia, for only a fraction of the cable neighborhood costs of $95,000 to $160,000 per month for a satellite digital video channel.

Live regional programming content can be similar to national "synchronous" channels: news, weather and sports. The low-cost regional bandwidth enables new (lower) levels of sports. such as secondary, and perhaps even primary, school administrations. Channel aggregation enables perhaps an even narrower "synchronous" audience, but the ability of the regional DTH multiplexer to add asynchronous services in unused channel bandwidth can make delivering video files more efficient and cost-effective.

Government services channels are also facilitated at this low entry cost. Such content may include local municipality meetings, issues discussions and services training. Educational services such as home schooling, tutoring and other distance learning applications can also brought into wide area video networking through a Regional DTH. Virtual tours of local landmarks and museums can also be organized through community or regional promotion bureaus. Issues channels through portable origination equipment and DSL can allow more community discussion to be aired. Service club speeches, alumni gatherings and fundraising can be benefited by the Regional video service.

Other programming of interest to a regional community (not an exhaustive list):
  Real Estate
  Auctions
  Banking (coupled with Enhanced TV applications)
  Gender-specific
  Interest or Hobby (i.e., "Corvette Car Club of Greater Los Angeles")
  Ethnic groups and interests In short, the Regional DTH multiplex has a rich set of programming opportunities available to it beyond the traditional Local-Into-Local television channels we know today.

The unused bandwidth in the Regional DTH channel is also available for a Video Pump enabled "pull" service. Where the Video Pump service is typically dedicated for "push" services, the Regional unused capacity can be sold on an as-available basis similar to load management at, for example, an airline or hotel. If a subscriber wants a high-value movie that is in the satellite DBS window today, it will be pre-positioned using "push" in the PVR for VoD. If someone wants last month's first-run movies, they may be on a three or six-hour carousel riding on the unused CONUS DTH "push" spectrum. However, if the movie that is desired is on the archive but not "multicastable" because of its obscurity, a low-cost but overnight pull service can be provided over the unused Regional DTH bandwidth.

A significant opportunity exists for DTH operators with local advertising. Today, only Cable and Broadcast TV have locally-available advertising. This advertising is focused on demographics, not just geographies, but regional broadcasting will be able to deliver a new class of local advertising, combined with targeted television. National DBS cannot provide this regionalization today.

Contribution Network

Figure 16:
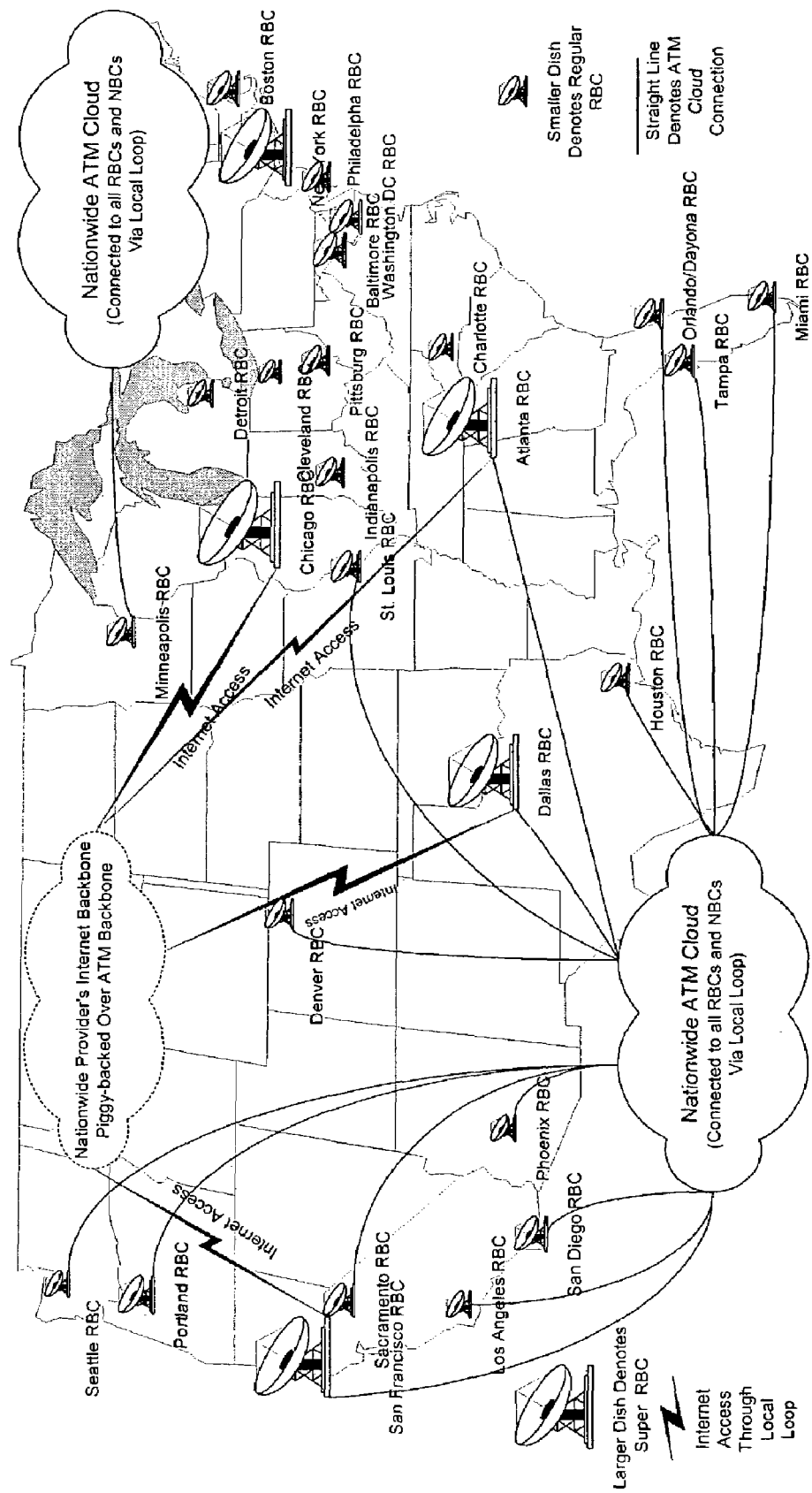
FIG. 16 illustrates a topology for the contribution network represented in the system of FIG. 12, in accordance with an embodiment of the present invention.

FIG. 16 illustrates a contribution network topology for a satellite communications system utilizing the Ka band, according to an embodiment of the present invention. As can be seen in the figure, a plurality of regional broadcast centers (RBCs) are provided across the country, represented as smaller satellite dishes. These RBCs each have their own satellite uplink gateway to broadcast local content in a spot beam with one of the two satellites described above. A distinction between a Ka band bent-pipe satellite and a processed payload satellite utilized for conventional DTH systems is that the uplink for a bent pipe spot beam must be from within the spot beam itself. Therefore, instead of having all content from different spot beams uplinked from a central facility, the content can be uplinked locally.

Technical Description of the Contribution Network

Figure 17:
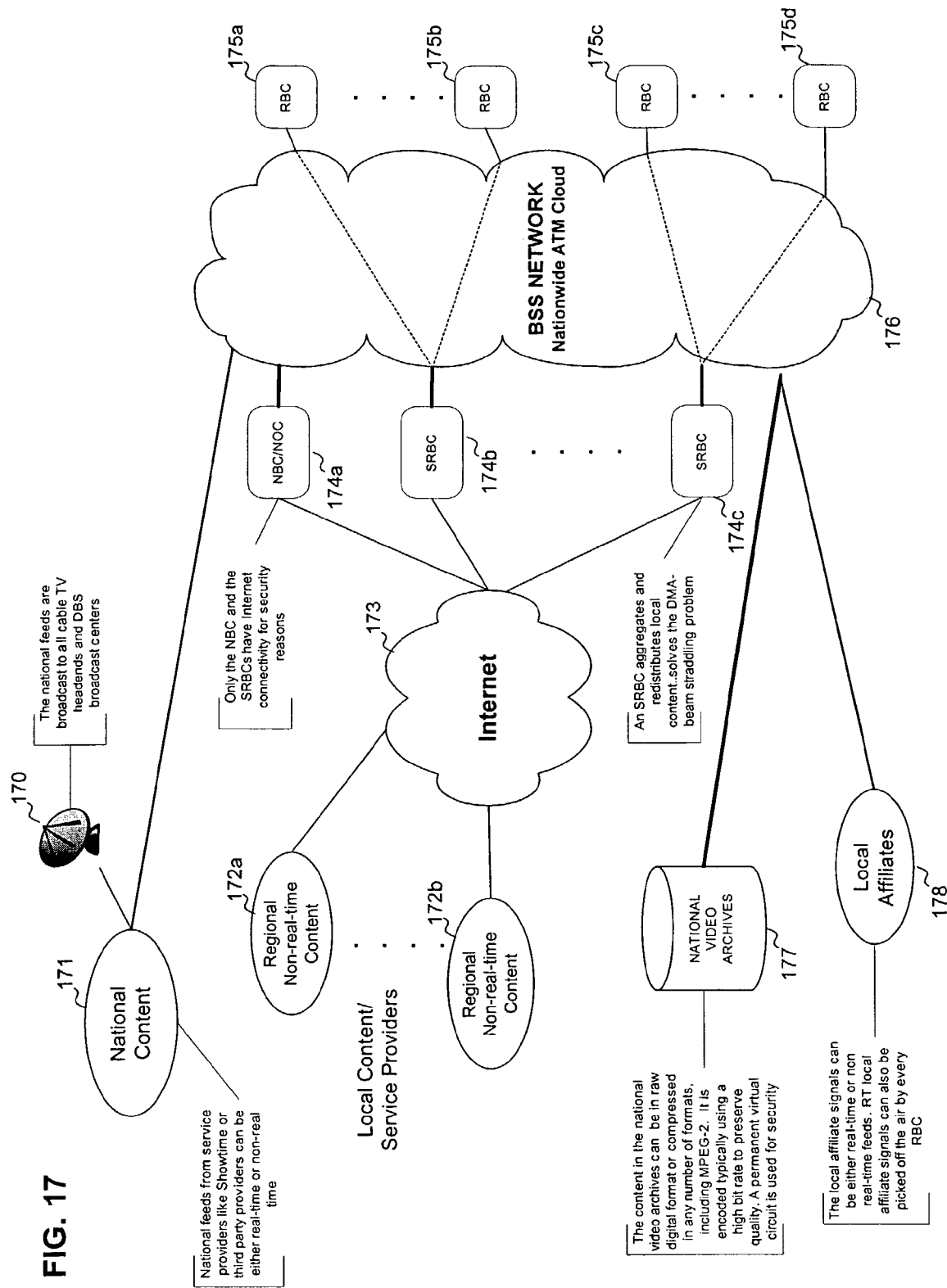
FIG. 17 is a schematic diagram illustrating the interrelationship between a super regional broadcasting center (SRBC), a regional broadcasting center (RBC), and a national broadcasting center (NBC), in accordance with an embodiment of the present invention.

FIG. 17 illustrates the relationship between the real-time and non-real time national content and regional content. As can be seen, the national real-time feeds 170 consist of real-time video programming from service providers such as Showtime and HBO, or third party service providers or aggregators. National real-time feeds can be transmitted to the broadcast center over encrypted and authenticated satellite links 171a and ground-based digital networks 171b. The real-time content can be transcoded and re-encrypted and recombined with other real time content as necessary prior to transmission over the DBS link.

National non-real time content 172 consists of high-value multimedia and data files. Non-real time content can include content from national video archives in raw digital format or compressed in any number of formats, including MPEG-2. It is encoded typically using a high bit rate to preserve quality. Non-real time content is typically captured and processed in the broadcast center prior to delivery over the video pump transport service. Non-real-time content also can be transmitted to the broadcast center over satellite links 172a or over ground-based digital networks 172b, typically using encrypted and authenticated permanent virtual circuits.

As described above, regional real-time content 173 consists of locally produced real-time programs from regional affiliates. The regional real-time feeds are typically transmitted to the broadcast center over low-latency ground based digital networks 173a. The links may not be encrypted as regional content and may be of lesser value than national content, however, low-latency performance must be guaranteed. The real-time content can be transcoded and re-encrypted and recombined with other real time content as necessary prior to transmission over the DBS link.

Regional non-real time content 174 consists of locally generated multimedia and data files. Non-real time content can include content from local video archives residing in local content houses and local service providers studios in raw digital format or compressed in any number of formats, including MPEG-2. Non-real time content is typically captured and processed in the broadcast center prior to delivery over the video pump transport service. Non-real-time content can be transmitted to the broadcast center over the Internet 175 using all types of connections ranging from minimally secure to fully encrypted and authenticated permanent virtual circuits.

The National Broadcast Center (NBC) is a national media hub, responsible for multimedia signal processing and for controlling the Business Support System (BSS) Network 178, a virtual network residing on top of a national ATM backbone, connecting all the super regional broadcast centers in a star architecture. The NBC is also home to the Network Operations Center (NOC) where the network is monitored 24/7, and transaction processing back-office services are conducted. Only the NBC 177 and the SRBCs 176a-176z have public Internet connectivity for security reasons.

The Super Regional Broadcast Centers (SRBCs) 176a-z aggregate and redistribute local content to and from the RBCs, solving the DMA-beam straddling problem that arises when two spot beams cover parts of the same DMA. As TV signals are assigned to a DMA, both beams would have to carry the same local TV station to ensure that the entire DMA population receives the signal. As part of the signal redistribution process, SRBCs can contain the database of local TV stations, DMAs and beam diameters and calculate which TV signals need to be transmitted or duplicated in each beam.

The regional broadcast centers (RBCs) 179a-z receive real-time and non-real-time content from the NBC and SRBC over secure low-latency connections, perform a minimal amount of signal processing and storage, and uplink the signals to the respective spot beams on the satellite.

Scheduling Content to Maximize Available Bandwidth

Figure 18:
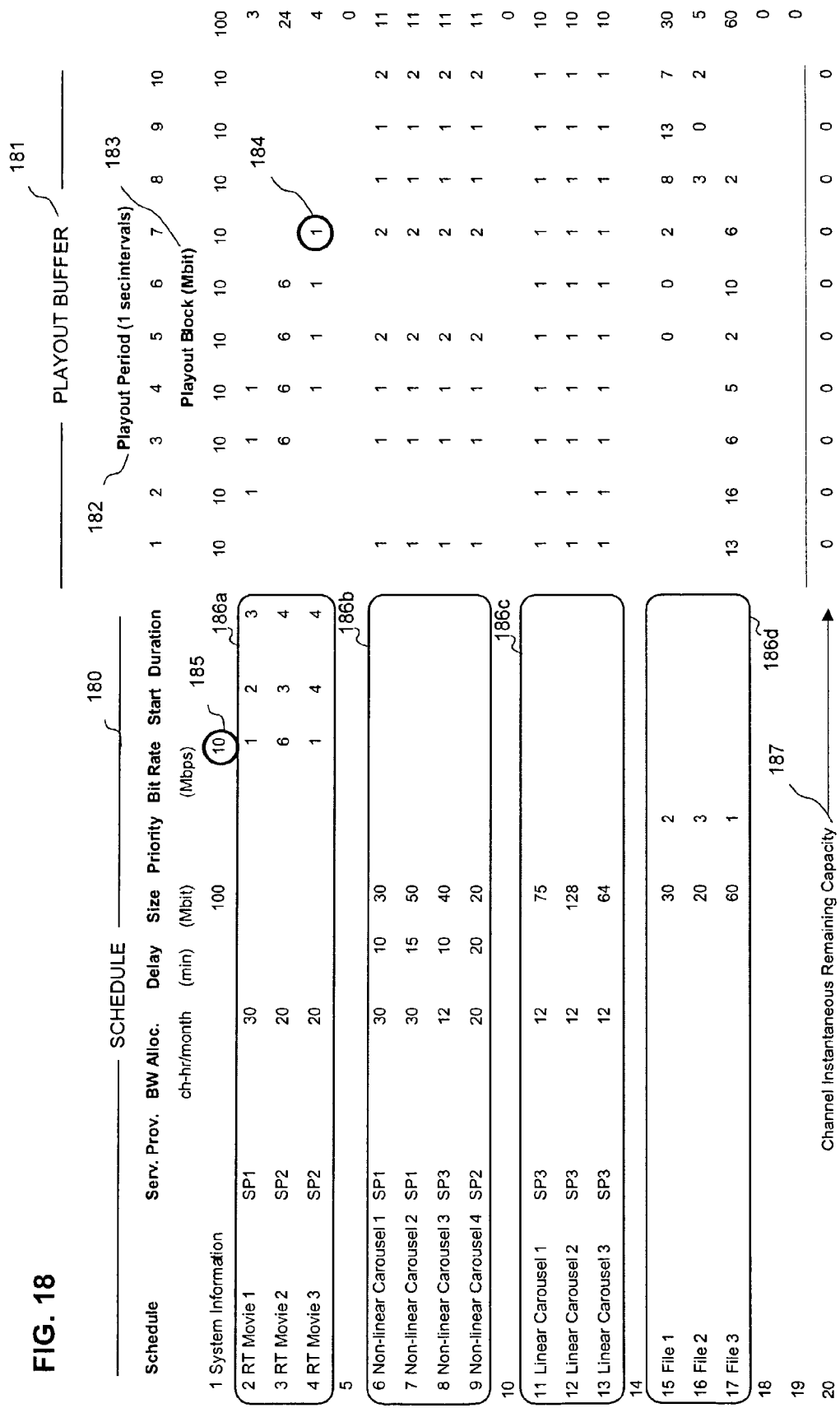
FIG. 18 is a chart illustrating the operation of the scheduler and bandwidth manager for providing real-time and non-real-time broadcast content in accordance with an embodiment of the present invention.

With all of the bandwidth available using a wideband communications channel, and the advantages associated with transmitting content over the Ka band, new challenges are faced for scheduling real-time and non-real time content in the wideband communications channel. FIG. 18 provides an exemplary chart for scheduling programming in a manner to maximize bandwidth.

Figure 19:
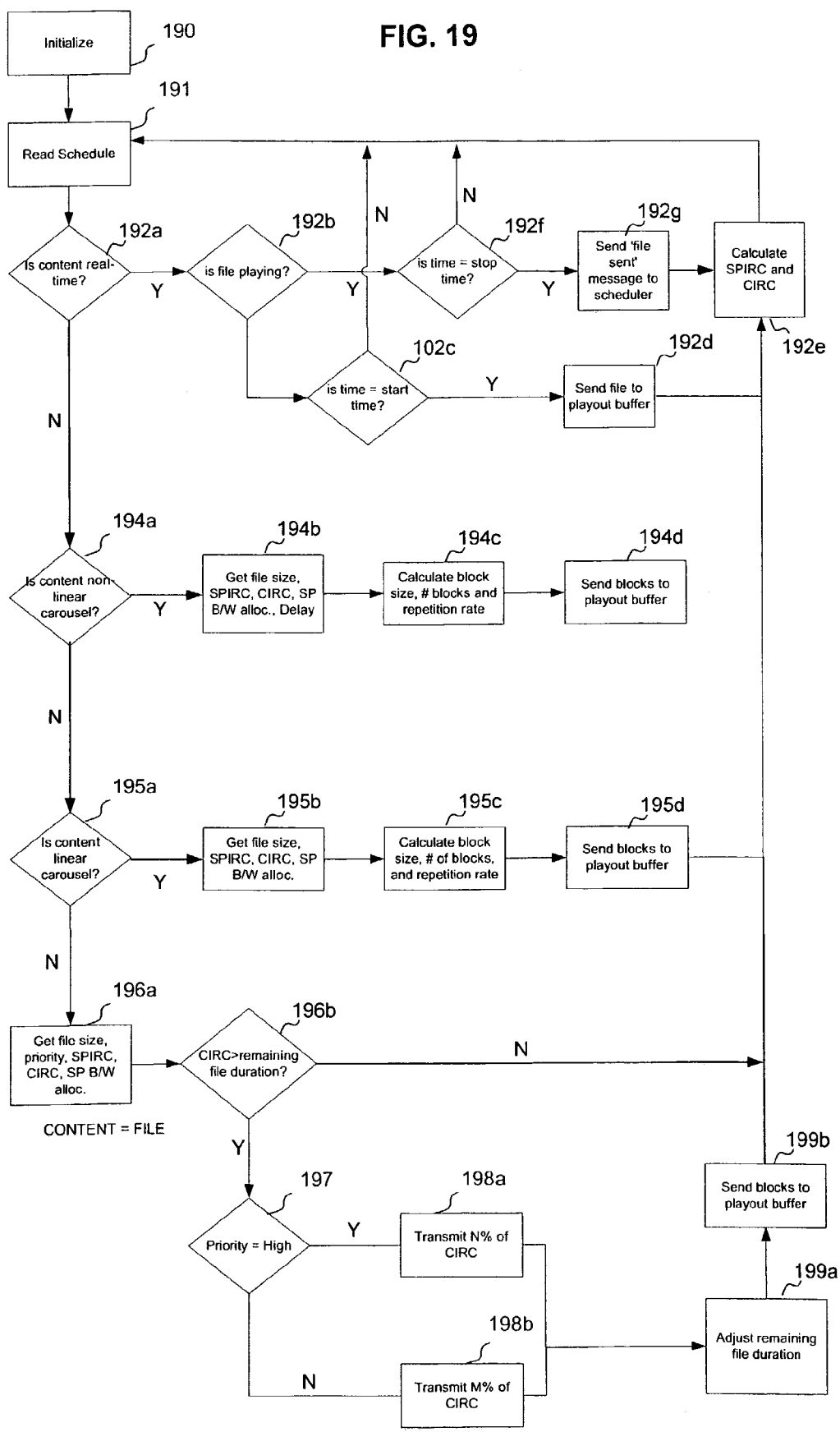
FIG. 19 is a flow chart illustrating the operation of the bandwidth manager in accordance with an embodiment of the present invention.
Figure 20:
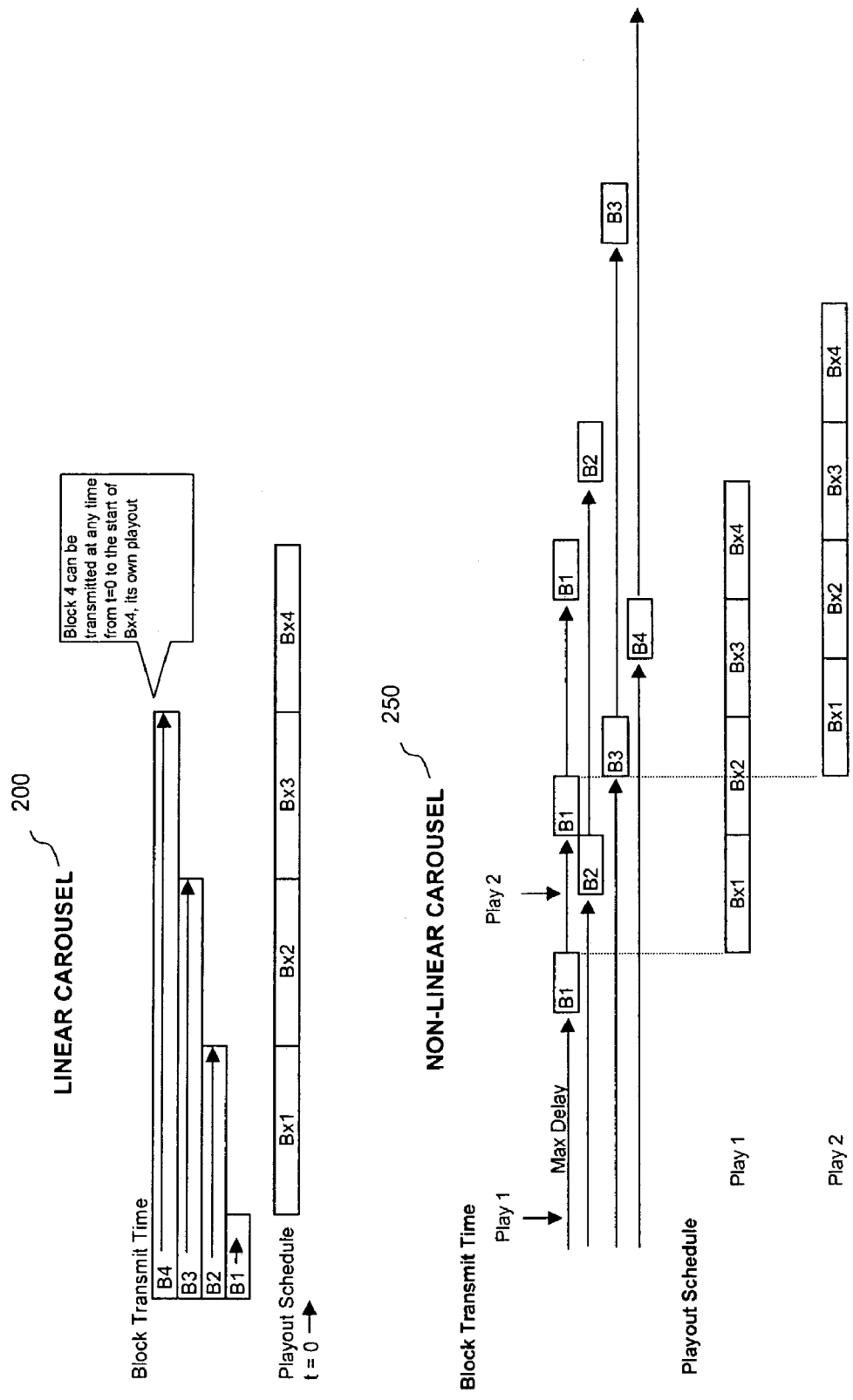
FIG. 20 is a diagram illustrating the provision of broadcast programming content in a linear carousel and a non-linear carousel, in accordance with an embodiment of the present invention.

The scheduler and bandwidth manager play an integral part in defining the operation of the video pump transport service. FIG. 18 shows an example of how the bandwidth manager application reads and interprets the schedule information to generate actual play commands to the multiplexer. FIG. 19 shows a flow chart describing one possible implementation of a bandwidth manager application. FIG. 20 is a graphical representation of video carousels used to transmit non-real-time video files over the video pump transport service.

Turning to FIG. 18, a bandwidth management process is presented with five types of content: system information, real time programs or services, files, non-linear carousels, and linear carousels. All of these methods are described in the sections that follow, followed by a flow chart and pseudo code describing the bandwidth management process.

The basic bandwidth management process defines a playout resolution and a channel capacity, both in megabits per second, and a real-time period defining the rate at which the channel loading can be manipulated to try to maximize utilization. The example uses a real-time period of 1 second and a playout resolution of 1 megabit per second. This simplifies the calculation and visualization of content divided into 1 megabit per second blocks.

System tables and informational files are continuously transmitted using a constant 10 Mbps channel. The bandwidth manager reserves this capacity as a constant, as shown in 183.

Real time content 185 is illustrated as including three movies, RT Movie 1, RT Movie 2, and RT Movie 3, each with a specific start, duration, and representative playout bit rate corresponding to the specific encoding and decoding process used. RT Movies 1 and 3 are standard definition movies encoded with MPEG-4 at a bit rate of 1 Mbps. RT Movie 2 is a high definition movie encoded at a bit rate of 6 Mbps. Real time content needs to play out at a rate fast enough to keep the receiver's buffer full. A playout period of 1 second requires the bandwidth manager to allocate a 1 Mbit block every second to RT movies 1 and 3, and a 6 Mbit block every second to RT movie 2.

Since the real time requirements have to be met, the bandwidth manager prioritizes all real time content by sorting the schedule by type and prioritizing any real-time content. The prioritization of the remaining content is arbitrary and can be developed on a variable basis, depending on the service level agreement between the service provider and the platform operator.

The non-linear carousel 186 relies on the cache or local storage device to emulate a video on demand service. As shown in 205 in FIG. 20, programs are divided into blocks and transmitted a non-linear repetition rate, with blocks near the start of the program sent more frequently. The block repetition rate is given by the following formula, which accounts for the desired minimum play delay.

The repetition rate for each block is calculated based on the following formula:

$$R_N = D + \sum_{i=1}^{N-1} B_i$$

where,
$R_N$=The repetition rate for the Nth block
D=The maximum time that a subscriber will wait before the movie begins
$B_i$=The duration of the $i^{th}$ block.

In accordance with this method, the application starts caching all of the blocks or packets associated with the program or service as soon as the initial program selection is made. If the first few minutes of a program are pre-stored in the local storage device, this method can provide a seamless Video On Demand service by playing the first program segment off of the local storage device, and the remaining segments off of the carousel. If no part of the program is pre-stored in the local storage device, then the user needs to wait a time D until the first block can be received.

This method relies on the client being able to play the media in real-time off of its storage device. The block size is determined by the size of the buffer in the client storage device, however, the block transmit time can be less than the playout time if storage is used. The variable transmit time provides flexibility in the bandwidth management process, as the only requirement is for the blocks to arrive before they are needed for playback.

FIG. 20, element 205, shows a snapshot of a single program divided into four blocks B1-B4. The four blocks are transmitted faster than real time over the video pump using the non-linear carousel method. The playout electronics reconstruct the original program by rate translating the transmitted blocks into their real time equivalents and reassembling them in the right sequence. Bx represents block rate translation from recorded speed to playout speed. This method is applicable to a group of programs as well, as the first block of all the programs can repeat at a faster rate than all the other subsequent blocks.

The non-linear carousel can be implemented to produce a constant average data rate should that facilitate bandwidth management. Variable size blocks can be used in order to have a constant average data rate for each block, with the duration for the $N^{th}$ block given by $$B_N = \frac{\left(D + \sum_{i=1}^{N-1} B_i\right) \cdot B_1}{D}$$

Returning to FIG. 18, the linear carousel 187 enables the user to access media in real time (i.e. watch a movie) while downloading it from a revolving broadcast data structure. This method, in conjunction with the client's storage device or cache, can emulate a real time channel.

To implement this method, a program or service is divided into data blocks, which are then transmitted in no particular order as long the overall time constraints shown in FIG. 20, element 200, are met. A block can be transmitted at any time between t=0 to its playout time. The variable transmit time provides flexibility in bandwidth management. The blocks are received, stored locally and then reassembled during the playback process. Once the user selects a program, all the blocks associated with it are cached on the storage device and read out or played in linear time with no discontinuities.

It is worth noting in FIG. 20, the repetition rate of any one block is once per program, however, the repetition rate could be increased to increase the probability of reception in an error prone environment. The block size and transmit delay are determined by the size of the buffer in the client storage device. As with the non-linear carousel, the block transmit time can be less than the playout time if storage is used.

In FIG. 18, files 188 do not have hard real time requirements, since they are delivered asynchronously for playout at arbitrary times in the home. Files are prioritized using three arbitrary priority levels associated with the required delivery speed, much like the postal service. The bandwidth manager typically applies a weighting algorithm to ensure the files are delivered according to their priority level. As shown in 188 files have the lowest priority.

Bandwidth Manager Flow Chart

The flow chart of FIG. 19 describes the bandwidth manager application for FIG. 18. The bandwidth manager inputs a schedule 180 and generates a playout buffer 181. The schedule is a listing of programs and files that need to be played within a particular period of time. The schedule contains program specific information, such as start, stop times, and durations for real-time programs, and file sizes and priorities for non-real time content. The playout buffer contains the real-time information describing which blocks or packets are sent to the wideband transport multiplexer. The bandwidth manager attempts to allocate bandwidth per the service level agreement between the service provider and the platform operator and optimize bandwidth utilization.

The bandwidth manager prioritizes real-time content first. File prioritization follows the priority level per the service level agreement. The bandwidth manager, in its initialization routine 190, first determines the appropriate playout buffer resolution, i.e. every ½ hour, every 14 min, every minute, etc. It then reads the schedule 180 in step 191 and determines whether, for a particular program on the schedule, the program is to be transmitted in a format as real-time content 192a, a non-linear carousel 194a, a linear carousel 195a, or a data file 196a. For each program in the schedule that is to be transmitted as real-time content, the system checks if the title or file is playing (active in the playout buffer) 192b. If the file is not playing and it is time to start 192c, then the bandwidth manager starts sending the file to the playout buffer 192d. If the file is already playing, it compares the actual time to the scheduled end time 192f and stops sending blocks 192g if both times are equal. As part of the stop operation, the bandwidth manager tells the scheduler that the file has been sent.

Block 193 is extremely important to the bandwidth management process. After each operation, the bandwidth manager calculates how much instantaneous capacity remains in the channel (channel instantaneous remaining capacity, CIRC) and how much of that capacity belongs to each service provider (service provider instantaneous remaining capacity, SPIRC). The SPIRC is important in that it tells the bandwidth manager how much capacity is available for NRT (real-time) content. After this calculation is performed, the system re-reads the schedule and repeats the process.

The bandwidth manager attempts to send the highest priority blocks until the channel capacity is fully utilized or until the specific service provider capacity allocation has been met. Once the bandwidth manager has sent all of the real-time content blocks to the playout buffer, it starts to process the video and data carousels, since they in effect occupy real-time bandwidth that cannot be used for opportunistic file delivery. Decision blocks 194a-d and 195a-d identify video carousel content.

In order to process video carousel content, the bandwidth manager reads file-specific information, consisting of the file size, its priority level, the delay (for non-linear carousel only) and the service provider, in steps 194b and 195b.

The bandwidth manager then calculates the block size, the number of blocks, and their repetition rate and schedules the block to be sent to the playout buffer, in steps 194c and 195c.

The file transmission process 196 is shown using an arbitrary limitation of two priority levels (high/low). The bandwidth manager attempts to utilize any remaining capacity for file transfer. The bandwidth manager calculates how many of the blocks associated with a specific file can be sent to the playout buffer for each playout period. This calculation is made using a weighting factor derived from the priority level, in steps 197, 198a and 198b. The remaining file duration is adjusted in step 199a and sent to the playout buffer in step 199b.

Pseudo Code

For every resolution period P, the schedule is evaluated to determine what needs to be sent to the playout buffer. The real-time content has the highest priority since it needs to be synchronized to real time, so the schedule is sorted by real time events first.

```
Main( );
For each time interval
    Sort schedule by real-time first
For each schedule entry
    If (entry = RT event)
RT_event( );
        Else If (entry = file_event)
File_Event( );
        Else If entry = linear_carousel
lcar( );
Else if entry = non-linear carousel
    Nlcar( );
    Next entry
Next interval
RT_event( );
If (time = start)
    Play( );
    Increment_Avail_BW ( );
Else If (time = start + duration);
    Stop( );
```

```
        Decrement_Avail_BW ( );
        Remove_prog_from_schedule( );
File_Event( );
Sort_by_priority( );
If priority = 1
        Program 80% until all priority files eliminated
If priority = 2
        Program 15% if priority 1 files exist
        Program 80% if priority 1 files do not exist
If priority = 3
        Program 5% if priority 1 or files exist
        Program 20% if priority 2 files only exist
        Program 100% if priority 3 files only exist
```

The foregoing disclosure of embodiments of the present invention has been presented for purposes of illustration and description. It is not intended to be exhaustive or to limit the invention to the precise forms disclosed. Many variations and modification of the embodiments described herein will be obvious to one of ordinary skill in the art in light of the above disclosure. The scope of the invention is to be defined only by the claims appended hereto, and by their equivalents.

What is claimed is:

1. A method for scheduling transmission of content in a broadcasting system, comprising:
    reading a schedule of content to be transmitted, wherein each item of content is grouped into a plurality of segments, and for each segment of each item of content,
        (i) if the item of content to be transmitted is real-time content,
            sending the real-time content to a playout buffer during a period of time scheduled for playback, and
            calculating a remaining available bandwidth after transmission of the real time content;
        (ii) if the item of content to be transmitted is carousel content,
            calculating a block size, a number of blocks, and a repetition rate to fit within the available bandwidth based upon the carousel content size and bandwidth allocation,
            sending blocks of the carousel content to the playout buffer, and
            calculating the remaining available bandwidth after transmission of the carousel content; and
        (iii) if the item of content to be transmitted is a file,
            transmitting a percentage of the file according to the available bandwidth and priority associated with transmission of the file,
    wherein the schedule is re-read after each calculation of the remaining available bandwidth.

2. The method of claim 1, wherein the content is to be transmitted over a satellite communications system.

3. The method of claim 2, wherein the content is to be transmitted over a direct-to-home satellite communications system.

4. The method of claim 3, wherein the carousel content is in a non-linear carousel format and wherein blocks of the carousel content are transmitted based in part upon a scheduled delay.

* * * * *